(12) United States Patent
Dick et al.

(10) Patent No.: US 10,679,284 B2
(45) Date of Patent: Jun. 9, 2020

(54) SYSTEM AND METHOD FOR COLLECTING REVENUE

(75) Inventors: Mischa Dick, Phoenix, AZ (US); Marjorie A. Green, Overland Park, KS (US); Gokhan Aydogan, Phoenix, AZ (US)

(73) Assignee: Six Sigma Systems, Inc., Overland Park, KS (US)

( * ) Notice: Subject to any disclaimer, the term of this patent is extended or adjusted under 35 U.S.C. 154(b) by 30 days.

(21) Appl. No.: 12/059,883

(22) Filed: Mar. 31, 2008

(65) Prior Publication Data

US 2009/0248481 A1    Oct. 1, 2009

(51) Int. Cl.
  *G06Q 40/02* (2012.01)
  *G06Q 10/06* (2012.01)
  *G06Q 10/10* (2012.01)

(52) U.S. Cl.
  CPC ......... *G06Q 40/02* (2013.01); *G06Q 10/0639* (2013.01); *G06Q 10/06316* (2013.01); *G06Q 10/10* (2013.01)

(58) Field of Classification Search
  CPC ........... G06Q 10/06311; G06Q 10/109; G06Q 10/06316
  USPC ........................................................... 705/9
  See application file for complete search history.

(56) References Cited

U.S. PATENT DOCUMENTS

| | | | |
|---|---|---|---|
| 5,933,809 A | 8/1999 | Hunt et al. | |
| 7,117,172 B1 | 10/2006 | Black | |
| 7,254,558 B2 * | 8/2007 | Hinkle et al. | 705/40 |
| 7,835,921 B1 | 11/2010 | Donnelly et al. | |
| 2002/0065694 A1 * | 5/2002 | Peters et al. | 705/7 |
| 2003/0078881 A1 * | 4/2003 | Elliott et al. | 705/39 |
| 2003/0233278 A1 * | 12/2003 | Marshall | 705/14 |
| 2005/0171811 A1 | 8/2005 | Campbell et al. | |
| 2007/0156557 A1 * | 7/2007 | Shao et al. | 705/35 |
| 2008/0133315 A1 * | 6/2008 | Singh | 705/10 |
| 2008/0306872 A1 | 12/2008 | Felsher | |
| 2010/0257080 A1 * | 10/2010 | Santalo et al. | 705/34 |

* cited by examiner

*Primary Examiner* — Bennett M Sigmond
*Assistant Examiner* — Michael D Cranford
(74) *Attorney, Agent, or Firm* — Sheppard, Mullin, Richter & Hampton LLP

(57) ABSTRACT

A system comprises an expected bad debt generator for generating probabilities of bad debt based on payer, types of services and or products rendered, and account information; a contract modeling engine for generating contractual adjustment factors based on contracts between payer and service providers, a gross net conversion generator for generating gross net conversion factors based on payer and account information; a priority calculating engine for prioritizing accounts and batches of accounts; a collector assignment engine for assigning the accounts to one or more collectors based on a predetermined collector assignment algorithm; an account batching engine for grouping accounts into batches for the purpose of best utilizing payer contacts; and a worklist generator for generating a worklist for each collector, the worklist identifying a prioritization order of one or more payers for the collector to contact to collect debt, the prioritization order being based on a predetermined prioritization algorithm.

20 Claims, 46 Drawing Sheets

| Home | Advanced Search | Assembly Worklist | Manage System | Reports / References / Resources | Change Password | Logout |
|---|---|---|---|---|---|---|

| Team | | Total | | 30-60 day | | 60-90 day | | 90-120 day | | Over 120 days | |
|---|---|---|---|---|---|---|---|---|---|---|---|
| | | qty | Balance | qty | Balance | qty | Balance | qty | Balance | qty | Balance |
| Collector | | 18,091 | $17,184,190.38 | 5,745 | $5,438,168.76 | 2,406 | $3,235,606.51 | 1,691 | $1,746,032.43 | 4,605 | $2,625,957.39 |
| | | 100 | $124,970.35 | 22 | $19,602.21 | 12 | $26,088.59 | 11 | $21,240.58 | 11 | $20,117.40 |
| | | 373 | $207,374.89 | 65 | $65,492.43 | 17 | $60,012.50 | 10 | $9,313.80 | 18 | $11,850.12 |
| | | 04 | $15,148.97 | 01 | $7,129.98 | 00 | $0.00 | 00 | $0.00 | 01 | $7,614.49 |
| | | 277 | $249,472.60 | 50 | $8,798.74 | 09 | $21,861.01 | 19 | $39,684.48 | 76 | $166,392.18 |
| | | 38 | $173,595.17 | 22 | $81,302.51 | 04 | $40,490.49 | 02 | $19,516.98 | 00 | $0.00 |
| | | 115 | $170,371.66 | 20 | $39,874.26 | 05 | $9,448.48 | 04 | $5,963.82 | 21 | $14,970.74 |
| | | 320 | $402,092.79 | 29 | $12,374.79 | 10 | $40,012.98 | 10 | $41,864.78 | 43 | $68,548.70 |
| | | 264 | $209,605.12 | 32 | $30,589.56 | 39 | $32,165.76 | 44 | $34,598.81 | 134 | $98,002.60 |
| | | 545 | $932,047.92 | 83 | $159,537.38 | 87 | $140,683.89 | 92 | $177,911.86 | 253 | $392,038.15 |
| | | 244 | $650,619.29 | 53 | $150,507.27 | 39 | $113,476.13 | 38 | $81,475.39 | 70 | $137,334.91 |
| | | 1,508 | ($682,680.74) | 470 | ($152,211.33) | 141 | ($125,438.62) | 157 | ($146,520.67) | 447 | ($235,727.72) |
| | | 183 | ($8,256.14) | 48 | ($7,599.29) | 24 | ($2,694.04) | 21 | ($24,418.74) | 61 | ($17,383.75) |
| | | 43 | $35,497.22 | 12 | $5,902.85 | 11 | $9,088.01 | 05 | $5,146.20 | 14 | $14,783.78 |
| | | 70 | $63,566.59 | 35 | $23,218.16 | 11 | $9,497.18 | 06 | $8,011.17 | 12 | $21,022.75 |
| Commercial 1 | | 1,140 | $1,243,265.15 | 415 | $385,409.20 | 177 | $157,846.44 | 85 | $89,425.99 | 146 | $125,648.30 |
| Commercial 1 | | 1,220 | $1,388,965.81 | 451 | $559,251.44 | 186 | $206,703.15 | 88 | $179,791.72 | 158 | $55,845.84 |
| Commercial 1 | | 1,227 | $1,767,958.52 | 455 | $694,422.45 | 170 | $262,933.06 | 112 | $91,830.99 | 154 | $98,560.09 |
| Commercial 2 | | 518 | $814,170.33 | 227 | $315,688.44 | 54 | $72,265.57 | 39 | $16,877.89 | 63 | $68,409.65 |
| Commercial 2 | | 618 | $928,058.65 | 249 | $358,201.88 | 99 | $100,113.53 | 39 | $61,497.93 | 81 | $104,660.03 |
| Commercial 2 | | 582 | $917,238.75 | 250 | $425,185.04 | 71 | $98,483.08 | 43 | $14,899.68 | 79 | $155,881.24 |
| Medicaid | | 2,200 | $1,748,082.74 | 322 | $379,956.78 | 119 | $52,753.57 | 129 | $159,077.09 | 1,372 | $832,606.15 |
| Medicaid | | 2,205 | $1,694,523.75 | 351 | $612,188.06 | 154 | $363,264.43 | 122 | $100,710.44 | 1,317 | $409,568.51 |
| Medicare | | 560 | $1,357,807.09 | 60 | $146,320.53 | 56 | $529,070.49 | 50 | $142,782.91 | 384 | $484,909.84 |
| Medicare | | 590 | $762,452.67 | 80 | $91,852.63 | 61 | $250,928.70 | 47 | $58,065.02 | 394 | $343,647.15 |
| MT Contract | | 10 | $42,853.13 | 02 | $18,309.44 | 02 | $6,878.37 | 01 | $733.74 | 05 | $16,931.58 |
| MT Misc | | 01 | $1,355.25 | 00 | $0.00 | 00 | $0.00 | 00 | $0.00 | 00 | $0.00 |
| SP or Agency | | 2,833 | $1,198,367.85 | 1,001 | $388,390.91 | 301 | $169,304.43 | 165 | $155,284.19 | 847 | $252,782.73 |
| WorkComp | | 303 | $775,665.00 | 111 | $248,096.51 | 46 | $339,099.81 | 32 | $44,593.29 | 80 | $96,756.73 |

CollectLogix Copyright © 2006 Six Sigma Systems, Inc. All Rights Reserved
About

FIG. 8A

CollectLogix

Data Update: Friday, November 23, 2007 5:59 AM

| Home | Advanced Search | Assembly Worklist | Manage System | Reports / References / Resources | Change Password | Logout |

[<<Back] Acct: [        ] [Search] Collector: [Failed Claims - E ▼] [Advanced Search]

Page: 1 of 4 -- 1 2 3 4 >>

| Coll | Liab Iplan | PT | Encounter Number | Patient Name | Acct Age | Discharge Date | Last Call Date | Final Bill Date | Acct Bal | Insurance Plan 1 | Insurance Plan 2 | Priority |
|---|---|---|---|---|---|---|---|---|---|---|---|---|
| Failed Claims - E | | TELIINP | AE0000132150 | | 135 | 07/11/07 | | 07/17/07 | $89,465.76 | SELF PAY VOLUNTARY FREE CARE | | $89,465.76 |
| Failed Claims - E | | TELIINP | AE0000135459 | | 122 | 07/24/07 | | 07/27/07 | $71,581.71 | SELF PAY VOLUNTARY FREE CARE | | $71,581.71 |
| Failed Claims - E | | TELIINP | AE0000134408 | | 134 | 07/12/07 | | 07/15/07 | $63,241.34 | SELF PAY VOLUNTARY FREE CARE | | $63,241.34 |
| Failed Claims - E | | TELIINP | AE0000159466 | | 70 | 09/14/07 | | 09/17/07 | $62,104.34 | SELF PAY VOLUNTARY FREE CARE | | $61,875.67 |
| Failed Claims - E | | TELIINP | AE0000132200 | | 136 | 07/10/07 | | 07/13/07 | $54,240.90 | SELF PAY VOLUNTARY FREE CARE | | $54,240.90 |
| Failed Claims - E | | TELIINP | AE0000143321 | | 113 | 08/02/07 | | 08/05/07 | $51,945.39 | SELF PAY VOLUNTARY FREE CARE | | $51,904.78 |
| Failed Claims - E | | TELIINP | AE0000127371 | | 143 | 07/03/07 | | 07/06/07 | $38,457.96 | SELF PAY VOLUNTARY FREE CARE | | $38,457.96 |
| Failed Claims - E | | TELIINP | AE0000118678 | | 141 | 07/05/07 | | 07/10/07 | $35,948.89 | UNINSURED TIER 1 > 400% | | $35,948.89 |
| Failed Claims - E | | TELIINP | AE0000156865 | | 86 | 08/29/07 | | 09/01/07 | $35,326.48 | SELF PAY MEDICAID TX PENDING | SELF PAY VOLUNTARY FREE CARE | $35,233.00 |

| CollectLogix | | | | | Data Update: Friday, November 23, 2007 5:59 AM |
|---|---|---|---|---|---|
| Home | Advanced Search | Assembly Worklist | Manage System | Reports/References/Resources | Change Password | Logout |

Next Items in Worklist:
[Call List] [<< Back] [NEXT >>]

| | Encounter Number | Plan | Phn Nbr |
|---|---|---|---|
| | AE0000135459 | SELF PAY VOLUNTARY FREE CARE | |
| | AE0000134408 | SELF PAY VOLUNTARY FREE CARE | |
| | AE0000159466 | SELF PAY VOLUNTARY FREE CARE | |
| | AE0000132200 | SELF PAY VOLUNTARY FREE CARE | |

AE0000132150   ACCOUNT SUMMARY   FB   Failed Claims - E

| Patient Info | Patient Name | DOB | Guarantor | PT | Patient Phone |
|---|---|---|---|---|---|

| Encounter Info | Admit Date | Dis Date | Acct Age | Admit Phone | Final Bill Date | Tot Ch | Balance | Priority |
|---|---|---|---|---|---|---|---|---|
| | 07/05/07 | 07/1107 | 135 | | 07/17/07 | $89,465.76 | $89,465.76 | |

| | Code Neum | Name | Balance | | | Group | Subscriber ID | | Pat Bal | |
|---|---|---|---|---|---|---|---|---|---|---|
| Liable | SELFVC | SELF PAY VOLUNTARY FREE CARE | 89465.76 | | | | | | 0.00 | $89,465.76 |
| Ins1 | SELFVC | SELF PAY VOLUNTARY FREE CARE | 89465.76 | | | | | Contract Doc Lookup | | Contract Lookup |
| Ins2 | | | | | | | | Contract Doc Lookup | | Contract Lookup |
| Ins3 | | | | | | | | Contract Doc Lookup | | Contract Lookup |

| CALL LOG | CHECKLIST | JOB AIDE | System Notes | | Transaction Detail |
|---|---|---|---|---|---|
| Collector | Payer Reason for Non-Payment | Call Date | Follow-Up | Notes | |

FIG. 8D

| Next Items in Worklist: | | Encounter Number | Plan | Phn Nbr |
|---|---|---|---|---|
| Call List | << Back  NEXT >> | AD0000067779 | CIGNA HMO | 8008314914 |
| | | AD0000067429 | CIGNA HMO | 8008314914 |
| | | AD0000073227 | CIGNA HMO | 8004239920 |
| | | AD0000071289 | TRICARE SOUTH REGION PRIME | 8004033950 |

AD0000021420        ACCOUNT SUMMARY                        Gin

| Patient Info | Patient Name | DOB | Guarantor | FB | PT | Patient Phone |
|---|---|---|---|---|---|---|

| Encounter Info | Admit Date | Dis Date | Acct Age | Admit Phone | Final Bill Date | Group | Subscriber ID | Tot Ch | Balance | Pat Bal | Priority |
|---|---|---|---|---|---|---|---|---|---|---|---|
| | 10/16/07 | 10/16/07 | 119 | | 10/19/07 | | | $3,662.73 | $174.76 | 0.00 | $57.91 |

| | Code Neum | Name | Balance | | | | | | | | |
|---|---|---|---|---|---|---|---|---|---|---|---|
| Liable | HCIGHM | MEDICARE | 174.76 | | | | | | Contract Doc Lookup | | Contact Lookup |
| Ins1 | MMCRE | MEDICARE | 0.00 | | | | | | Contract Doc Lookup | | Contact Lookup |
| Ins2 | HCIGHM | CIGNA HMO | 174.76 | | | | | | Contract Doc Lookup | | Contact Lookup |
| Ins3 | | | | | | | | | Contract Doc Lookup | | Contact Lookup |

| CALL LOG | | CHECKLIST | JOB AIDE | System Notes | Transaction Detail |
|---|---|---|---|---|---|

| Collector | Payer Reason for Non-Payment | Call Date | Follow-Up | Notes |
|---|---|---|---|---|
| | Other | 2/5/2008 | 2/12/2008 | 1. Contact: PER PREVIOUS NOTE; 2. REASON FOR NON-PAYMENT / UNDERPAYMENT / DENIAL: WILL ALLOW CIGNA MORE TIME TO REPROCESS CLAIM.; |
| | Denial - Other | 1/29/2008 | 2/5/2008 | 1. Contact: CIGNA EOB; 2. REASON FOR NON-PAYMENT / UNDERPAYMENT / DENIAL:NA; 3. The amount of the denial is: $0.00; 7. NOTE:ZERO PAYMENT SHOWS CIGNA WILL PAY CLAIM @ 174.76 IN 4-8 WEEKS.; |
| | Claim is processing / pending at payer | 1/22/2008 | 2/5/2008 | 1. Contact: MELINDA; 2. DEF OF IN PROCESS:IN PROCESS; 3. CLAIM RECEIVED DATE:1/15/08; 7. ACTION REQUEST SUBMITTED (BC)N/A; 8. ADD INFO:NEED TO ALLOW MORE TIME.; |
| | | 1/7/2008 | | Checklist Sent:Mail, Items submitted: EOB Ins 1 - Shared Drive / File Cab; UB-92 / UB-04; |
| | Payer Requires Additional Information | 1/7/2008 | 1/21/2008 | 1. Contact: PER EOB CIGNA; 2. Additional information is needed to:MCARE EOB; 3. SPECIFIC RECORDS NEEDED:MCARE EOB; 5. RECORDS SEND TO ADDRESS:CIGNA PO BOX 182223 CHATTANOOGA TN 37422; |
| | | 1/7/2008 | | Checklist requested |
| | Payment Received - Paid Per Contract | 11/17/2007 | 12/1/2007 | 1. Contact: MCARE RA 110507; 2. NOTE:MC PD 541.27 COINS 174.76 QUEUE 2NDARY CLAIM; |

CollectLogix Copyright © 2006 Six Sigma Systems, Inc. All Rights Reserved
About

Next Items in Worklist:
[Call List] [<< Back] [NEXT >>]

| | Encounter Number | Plan | Phn Nbr |
|---|---|---|---|
| | AD0000067779 | CIGNA HMO | |
| | AD0000067429 | CIGNA HMO | |
| | AD0000073227 | CIGNA HMO | |
| | AD0000071289 | TRICARE SOUTH REGION PRIME | Gin |

AD0000021420    ACCOUNT SUMMARY

Patient Info

| Patient Name | DOB | Guarantor | FB | PT | Patient Phone | |
|---|---|---|---|---|---|---|

Encounter Info

| | Admit Date | Dis Date | Acct Age | Admit Phone | Final Bill Date | Tot Ch | Balance | Pat Bal | Priority |
|---|---|---|---|---|---|---|---|---|---|
| | 10/16/07 | 10/16/07 | 119 | | 10/19/07 | $3,662.73 | $174.76 | 0.00 | $57.91 |

| | Code | Neum | Name | Balance | | | Group | Subscriber ID | | |
|---|---|---|---|---|---|---|---|---|---|---|
| Liable | HCIGHM | | MEDICARE | 174.76 | | | | | | Contract Doc Lookup | Contact Lookup |
| Ins1 | MMCRE | | MEDICARE | 0.00 | | | | | | Contract Doc Lookup | Contact Lookup |
| Ins2 | HCIGHM | | CIGNA HMO | 174.76 | | | | | | Contract Doc Lookup | Contact Lookup |
| Ins3 | | | | | | | | | | Contract Doc Lookup | Contact Lookup |

CALL LOG    CHECKLIST    JOB AIDE    System Notes    Transaction Detail

Create New/Edit Checklist

| Checklist ID | IPlan | Request Date | Status | Completion Date | Item Notes | |
|---|---|---|---|---|---|---|
| 4522 | CIGNA HMO | 1/7/2008 8:43:16 AM | Mailed | 1/7/2008 9:48:52 AM | FROM LISA/PLEASE PRINT MCARE EOB FROM PC PRINT;MCARE EOB 11/05/07 UCRN=ADAE1870; UCRN= ADAF4263; | View/Edit |

CollectLogix Copyright © 2006 Six Sigma Systems, Inc. All Rights Reserved

FIG. 8E

| Home | Advanced Search | Assembly Worklist | Manage System | Reports / References / Resources | Change Password | Logout |

Checklist ID

Encounter Number: AD0000021420

Iplan: HCIGHM - CIGNA HMO ▼

Medical Record Num: [    ]

Mail to information:
First Name [    ] Last Name [    ]
Co Name: [    ]
Fax #: [    ]
Street/PO: [    ]
Email: [    ]
City: [    ]
State: [    ]
Zip: [    ]

Mail Method
Mail ▼
Requested Date 02/12/2008
Completion Date N/A
Provider Facility [    ]

Subscription ID

Total Charges 3,662.73
Adm Date 10/16/2007
Dis Date 10/16/2007
Acct Balance 174.76

Patient/GU Info:
Patient Name          GU Name
Patient SSN           GU SSN
Patient DOB           GU DOB
05/04/1941
Patient Phone         GU Phone
Patient Street        GU Street
Patient Address       GU Address Checklist Submitter Add New Item:
Item: 1500 pro claim
[Add Item]
Checklist Notes: [    ]

Item Status: Not Pulled ▼    Item Note: [    ]

Status: Requested ▼

[Submit]   [Checklist Completed]   [Back]

CollectLogix Copyright © 2006 Six Sigma Systems, Inc. All Rights Reserved

FIG. 8F

| Home | Advanced Search | Assembly Worklist | Manage System | Reports / References / Resources | Change Password | Logout |

Next Items in Worklist:
[Call List] [<< Back] [NEXT >>]

| Encounter Number | Plan | Phn Nbr |
|---|---|---|
| AD0000067779 | CIGNA HMO | |
| AD0000067429 | CIGNA HMO | |
| AD0000073227 | CIGNA HMO | |
| AD0000071289 | TRICARE SOUTH REGION PRIME | |

AD0000021420    ACCOUNT SUMMARY

Patient Info

| Patient Name | DOB | Guarantor | FB | Gin |
|---|---|---|---|---|

Encounter Info

| Admit Date | Dis Date | Acct Age | Admit Phone | Final Bill Date | Tot Ch | Group | Subscriber ID | PT | Patient Phone |
|---|---|---|---|---|---|---|---|---|---|
| 10/16/07 | 10/16/07 | 119 | | 10/19/07 | $3,662.73 | | | | |

| | Code Neum | Name | Balance | | | | | | Balance | Pat Bal | Priority | |
|---|---|---|---|---|---|---|---|---|---|---|---|---|
| Liable | HCIGHM | MEDICARE | 174.76 | | | | | | $174.76 | 0.00 | $57.91 | |
| Ins1 | MMCRE | MEDICARE | 0.00 | | | | | | | | | Contact Lookup   Contract Doc Lookup   Contact Lookup |
| Ins2 | HCIGHM | CIGNA HMO | 174.76 | | | | | | | | | Contact Lookup   Contract Doc Lookup   Contact Lookup |
| Ins3 | | | | | | | | | | | | Contact Lookup   Contract Doc Lookup   Contact Lookup |

CALL LOG    CHECKLIST    JOB AIDE    System Notes    Transaction Detail

Select Scenario: [Select a Scenario ▼]    Create New/Edit Checklist

CollectLogix Copyright © 2006 Six Sigma Systems, Inc. All Rights Reserved

FIG. 8G

ACCOUNT SUMMARY

AD0000021420      FB |      Gin

Patient Info

| Patient Name | DOB | Guarantor | PT | Patient Phone |
|---|---|---|---|---|

Encounter Info

| Admit Date | Dis Date | Acct Age | Final Bill Date | Tot Ch | Balance | Pat Bal | Priority |
|---|---|---|---|---|---|---|---|
| 10/16/07 | 10/16/07 | 119 | 10/19/07 | $3,662.73 | $174.76 | 0.00 | $57.91 |

| | Code Neum | Name | Balance | Admit Phone | Group | Subscriber ID | | |
|---|---|---|---|---|---|---|---|---|
| Liable | HCIGHM | MEDICAID | 174.76 | | | | Contract Doc Lookup | Contact Lookup |
| Ins1 | HMCRE | MEDICARE | 0.00 | | | | Contract Doc Lookup | Contact Lookup |
| Ins2 | HCIGHM | CIGNA HMO | 174.76 | | | | Contract Doc Lookup | Contact Lookup |
| Ins3 | | | | | | | Contract Doc Lookup | Contact Lookup |

CALL LOG     CHECKLIST     JOB AIDE     System Notes     Transaction Detail

Select Scenario: Denial - Incorrect HCPCS Rev Codes ▼     Create New/Edit Checklist Questions:

Method of Contact \ Who am I speaking to?

What is the amount of the denial (subtract patient portion. ONLY ENTER NUMBERS, NO TEXT OR $ signs)?

Which HCPCS or Rev codes are being denied? Provide incorrect HCP C or or Rev codes to biller for correcting the claim.

Where should the corrected claim be submitted? (Ideally emailed or faxed, mail to physical address only if necessary)

What is the reference # or claim # or interim bill #?

Additional Information and Notes

Follow up in [14] days

[Save] [Cancel]

CollectLogix Copyright © 2006 Six Sigma Systems, Inc. All Rights Reserved

FIG. 8H

ACCOUNT SUMMARY

AD0000021420 | | | | FB | | Gin

Patient Info

| Patient Name | | DOB | Guarantor | PT | Patient Phone |
|---|---|---|---|---|---|
| | | | | | |

Encounter Info

| Admit Date | Dis Date | Acct Age | Admit Phone | Final Bill Date | Tot Ch | Balance | Pat Bal | Priority |
|---|---|---|---|---|---|---|---|---|
| 10/16/07 | 10/16/07 | 119 | | 10/19/07 | $3,662.73 | $174.76 | 0.00 | $57.91 |

| | Code | Neum | Name | Balance | Group | Subscriber ID | | |
|---|---|---|---|---|---|---|---|---|
| Liable | HCIGHM | | MEDICARE | 174.76 | | | Contract Doc Lookup | Contact Lookup |
| Ins1 | MMCRE | | MEDICARE | 0.00 | | | Contract Doc Lookup | Contact Lookup |
| Ins2 | HCIGHM | | CIGNA HMO | 174.76 | | | Contract Doc Lookup | Contact Lookup |
| Ins3 | | | | | | | Contract Doc Lookup | Contact Lookup |

CALL LOG | CHECKLIST | JOB AIDE | System Notes | Transaction Detail

| Code | Date | Notes |
|---|---|---|
| | 2/5/2008 | NCED: 02/05/08 TO 03/06/08 |
| | 2/5/2008 | STMT COLL EVT #4 SEQ #5 PRINTED MSG: EMD STAT |
| | 1/30/2008 | BKBEVRL-DENIAL - OTHER-1. CONTACT CIGNA EOB; 2. REASON FOR NON-PAYMENT / UNDERPAYMENT / DENIAL NA; 3. THE AMOUNT OF THE DENIAL IS $0.00; 7. NOTE ZERO PAYMENT SHOWS CIGNA WILL PAY CLAIM @ 174.76 IN 4-8 WEEKS |
| | 1/28/2008 | REMIT: D05 DUPLICATE CHARGE/CLAIM; REMIT AMT: 174.76 DUPLICATE |
| | 1/28/2008 | REMIT: D20 OTHER/PLEASE COMMENT ACCOUNT; REMIT AMT: 174.76 PENDING |
| | 1/23/2008 | ADDED TO CLAIM QUEUE BILL 2 HCIGHM EUBCOO |
| | 1/23/2008 | GXBURTON-CLAIM IS PROCESSING / PENDING AT PAYER-1. CONTACT MELINDA; 2. DEF OF IN PROCESS IN PROCESS; 3. CLAIM RECEIVED DATE 1/15/08; 7. ACTION REQUEST SUBMITTED (BC)N/A; 8. ADD INFO NEED TO ALLOW MORE TIME. |
| | 1/7/2008 | LDHARTWE-PAYER REQUIRES ADDITIONAL INFORMATION-1. CONTACT PER EOB CIGNA; 2. ADDITIONAL INFORMATION IS NEEDED TO MCARE EOD; 3. SPECIFIC RECORDS NEEDED MCARE EOB; 5. RECORDS TO ADDRESS CIGNA PO BOX 182223 |
| | 1/6/2008 | NCED: 01/06/08 TP 02/05/08 |
| | 1/6/2008 | STMT COLL EVT #3 SEQ #4 PRINTED MSG: EMD STAT |
| | 12/28/2007 | :REMIT: 16 ADJUDICATION/INFO NEEDED: REMIT AMT: 174.76 NEED INFO |
| | 12/22/2007 | COLLECTION EVENT LETTER EVENT TYPE: LETTER |
| | 12/22/2007 | COLLECTION EVENT NCED: 12/22/07 TO 01/06/08 |
| | 12/22/2007 | LETTER |
| | 12/22/2007 | LETTER INSTRACE PRINTED |
| | 12/7/2007 | NCED: 12/06/07 TO 12/22/07 |
| | 12/7/2007 | STMT COLL EVT #1 SEQ #2 PRINTED MSG: EMD STAT |
| | 12/6/2007 | CCG CHANGED FROM INS.NLA TO INS2.NLA |

FIG. 8I

ACCOUNT SUMMARY

AD0000021420 | | | | | | FB | | Gin

Patient Info

| Patient Name | DOB | Guarantor | PT | Patient Phone |
|---|---|---|---|---|

Encounter Info

| Admit Date | Dis Date | Acct Age | Final Bill Date | Tot Ch | Balance | Pat Bal | Priority |
|---|---|---|---|---|---|---|---|
| 10/16/07 | 10/16/07 | 119 | 10/19/07 | $3,662.73 | $174.76 | 0.00 | $57.91 |

| | Code Neum | Name | Balance | Admit Phone | Group | Subscriber ID | | | |
|---|---|---|---|---|---|---|---|---|---|
| Liable | HCIGHM | MEDICARE | 174.76 | | | | | Contract Doc Lookup | Contact Lookup |
| Ins1 | MMCRE | MEDICARE | 0.00 | | | | | Contract Doc Lookup | Contact Lookup |
| Ins2 | HCIGHM | CIGNA HMO | 174.76 | | | | | Contract Doc Lookup | Contact Lookup |
| Ins3 | | | | | | | | Contract Doc Lookup | Contact Lookup |

CALL LOG | CHECKLIST | JOB AIDE | System Notes | Transaction Detail

| Code | Date | Description | Amount |
|---|---|---|---|
| P | 1/28/2008 | PAYHCIGHM | $0.00 |
| P | 1/28/2008 | PAYHCIGHM | $0.00 |
| P | 12/28/2007 | PAYHCIGHM | $0.00 |
| A | 11/5/2007 | CAPMMCRE | $2,787.95 |
| A | 11/5/2007 | CAPMMCRE | ($2,787.95) |
| P | 11/5/2007 | PAYMMCRE | ($541.27) |
| A | 10/26/2007 | CAPMMCRE | ($158.75) |
| A | 10/21/2007 | CAPMMCRE | ($2,787.95) |

CollectLogix Copyright © 2006 Six Sigma Systems, Inc. All Rights Reserved

FIG. 8J

Keyword Search

Encounter Nmbr: _____
Patient Name: _____
Collector: Select a Collector ▸
FC: Select a Financial Class ▸
PT: Select a Patient Type ▸
Acct Age: Between ___ and ___
Priority: Between ___ and ___
<<Back  +Search UCRN Search UCRN Number: _____
<<Back  +Search CollectLogix Copyright © 2006 Six Sigma Systems, Inc. All Rights Reserved

FIG. 8K

CheckList Status Filter: Requested ▼  Search  Reset  ☐ Show Just Checked Out to Me

| CheckList Id | Enct No | PI Name | IPlan | Request Date | Status | Completion Date | Notes | | Checked Out To |
|---|---|---|---|---|---|---|---|---|---|
| 5960 | AD0000045007 | | MEDICAID LA | 2/12/2008 4:14:19PM | Requested | | ,1/08/08 HHUMGP NUMBER 407:MCARE CROSSOVER LETTER; UCRN # ADAJ4529 TRACK #1404; | View CheckOut | |
| 5893 | AD0000064037 | | ARKANSAS REHABILITATION | 2/11/2008 3:14:41PM | Requested | | from Brenda - reference case#1900420 on paperwork. Thanks, Brenda; UCRN= ADAH3758; GILSBAR 2/6/08 batch 143 for 6676.15; | View Undo Checkout | kbschuff |

CollectLogix Copyright © 2006 Six Sigma Systems, Inc. All Rights Reserved

FIG. 8L

Keyword Search

Encounter Nmbr: [          ]
Patient Name: [adams]
Collector: [Select a Collector ▼]
FC: [Select a Financial Class ▼]
PT: [Select a Patient Type ▼]
Acct Age: Between [   ] and [   ]
Priority: Between [   ] and [   ]
[<<Back] [+Search]

UCRN Search

UCRN Number: [          ]
[<<Back] [+Search]

*Top 25 Results from your search criteria...*

| Coll | FC | PT | Encounter Number | Patient Name | Acct Age | Discharge Date | Last Call Date | Final Bill Date | Acct Bal | Insurance Plan 1 | Insurance Plan 2 | Priority |
|---|---|---|---|---|---|---|---|---|---|---|---|---|
|  | SELFT1 | NSMIINP | AD0000023073 |  | 162 | 08/30/07 |  | 09/04/07 | $3,000.00 | UNINSURED TIER 1 > 400% |  | $3,000.00 |
|  | PBCFLA | NSMOOBV | AD0000004292 |  | 205 | 07/18/07 | 01/23/08 | 07/23/07 | $1,022.13 | BLUE CROSS FEDERAL (LA) |  | $1,022.13 |
| SP or Agency |  | NSMIINP | AD0000065321 |  | 43 | 12/29/07 | 01/23/08 | 01/01/08 | $942.00 | MEDICARE |  | $942.00 |
| Angela | KMCDLC | NSMOER | AD0000020067 |  | 172 | 08/20/07 | 10/29/07 | 08/25/07 | $849.68 | MEDICAID LA COMMUNITY CARE |  | $849.68 |
|  | SELFPK | NSMOER | AD0000064364 |  | 50 | 12/22/07 |  | 12/25/07 | $797.92 | SELF PAY KD FMLY PLN BENIFIT |  | $797.92 |
|  | SELFT1 | NSMOER | AD0000061030 |  | 60 | 12/12/07 |  | 12/15/07 | $1,800.00 | UNINSURED TIER 1 > 400% |  | $720.00 |
|  |  | NSMODS | AD0000001563 |  | 207 | 07/16/07 | 08/17/07 | 07/21/07 | $700.00 | BLUE CROSS PPO (LA) |  | $700.00 |
| Angela | KMCDLC | NHLOER | AA0000006859 |  | 183 | 08/10/07 | 09/12/07 | 08/14/07 | $637.89 | MEDICAID LA COMMUNITY CARE |  | $637.89 |

FIG. 8M

NEW SCENARIO

| Scenario ID | Scenario Name | | | |
|---|---|---|---|---|
| 3 | Payment (lockbox) not posted, check is in the mail | Edit | Delete | Display Scenario |
| 5 | Payment (EFT) not posted | Edit | Delete | Display Scenario |
| 9 | Claim is processing / pending at payer | Edit | Delete | Display Scenario |
| 15 | Payer Requires Additional Information | Edit | Delete | Display Scenario |
| 17 | Denial - Medical necessity | Edit | Delete | Display Scenario |
| 19 | Waiting receipt of accident details | Edit | Delete | Display Scenario |
| 21 | Payer Review -Pre-exisiting Condition | Edit | Delete | Display Scenario |
| 23 | Coordination of benefits / TPL | Edit | Delete | Display Scenario |
| 25 | Denial - Incorrect insured information | Edit | Delete | Display Scenario |
| 29 | Denial - Invoice or National Drug Code required | Edit | Delete | Display Scenario |
| 31 | Denial - Incorrect HCPCS Rev Codes | Edit | Delete | Display Scenario |
| 33 | Claim not on file at payer | Edit | Delete | Display Scenario |
| 35 | Denial - Lack of timely filing | Edit | Delete | Display Scenario |
| 37 | Payer Review - High Dollar | Edit | Delete | Display Scenario |
| 39 | Payer Review - Third party audit | Edit | Delete | Display Scenario |
| 41 | Payment Made to Wrong Provider | Edit | Delete | Display Scenario |
| 43 | Payment Made to Patient | Edit | Delete | Display Scenario |
| 45 | Self funded company | Edit | Delete | Display Scenario |
| 47 | Re-pricing company | Edit | Delete | Display Scenario |
| 49 | Denial - Missing Precert / Authorization (non-Medicaid) | Edit | Delete | Display Scenario |
| 51 | Appeals (Non Government) | Edit | Delete | Display Scenario |

FIG. 8N

NEW SCENARIO REGISTRATION

Scenario Name: ☐
Scenario Default Follup Days: ☐

Please Assign one or more teams to this Scenario.

☐ Medicare ☐ Misc-SelfPay ☐ PNSMCASE ☐ SP or Agency ☐ MT Contact ☐ Management
☐ Commercial 1 ☐ PNSMADMT ☐ NPHLADMT ☐ Z_Other ☐ MT Misc ☐ Assembly
☐ Commercial 2 ☐ PNSMHIM ☐ PNSMAUDT ☐ WorkComp ☐ AC ☐ Customer Service
☐ Z-Cats-n-Dogs ☐ Medicaid Please Select Questions and Answer Types for Scenario

| Selection | Question ID | Question | Order |
|---|---|---|---|
| ☐ | 1 | Why is the claim in Appeal? | ☐ |
| ☐ | 2 | What is the fax # or physical address to submit appeal? (ideally faxed, mail to physical adress only if necessary) | ☐ |
| ☐ | 3 | Request records needed for an appeal. Select the appropriate detail from the checklist. | ☐ |
| ☐ | 4 | What is the reference # or claim # or interim bill #? | ☐ |
| ☐ | 5 | If busy -- call information for direct number. | ☐ |
| ☐ | 6 | Make 3 call attempts | ☐ |
| ☐ | 7 | Look up correct number (1. Other accounts, 2. Web address, 3. Patient, 4. HR department employer, 5. Physican office) | ☐ |
| ☐ | 8 | Note correct number in HBO/Meditech | ☐ |
| ☐ | 12 | What is your definition of "in-process" or "pending"? | ☐ |

FIG. 80

| Please Select Required Statement of Law for Scenario | | |
|---|---|---|
| Selection | Law ID | Statement of Law |
| ☐ | 3 | If SB 418 applies: "Senate Bill 418 states that you must take action within 45 days of receipt of a non-electronically submitted claim, and within 30 days of receipt of a claim submitted electronically. Prior to expiration of the statutory deadline you must either pay the entire contracted amount, deny the claim, pay part of the claim and deny or audit the remainder and pay 100 percent of the applicable contracted portion, notify us that the claim is being audited and pay 100 percent of the applicable contracted rate or notify us that the claim is defient. |
| ☐ | 5 | Please be advised that under SB 418 you may only make one request per claim, limited to the patients medical record or billing records. We will be glad to provide the information you requested to you. Please be further advised that you must act within 15 days of receipt of the information or within the statutory prompt pay rules, whichever is later. IF THIS IS A SECOND / THIRD INFORMATION REQUEST: Please be advised that you are in violation of SB418 stating that you may only make 1 request for additional information. IF IT HAS BEEN MORE THAN 15 DAYS SINCE RECEIPT OF ADDITIONAL INFORMATION / VIOLATION OF STATUTORY RULES: Please be advised that you are in violation of SB 418 and that the penalties outlined in SB 418 apply, which allow us to demand up to 100% of contracted rates plus 18% interest as a penalty amount. |
| ☐ | 7 | If SB 418 applies: "Please be advised that under SB418, if a preauthorization has been issued, you may not deny or reduce payment or the claim for reasons of medical necessity of appropriateness unless we materially misrepresented the proposed services or substantially failed to perform the preauthorized service." IF THE STATUTORY RULES HAVE BEEN VIOLATED: "Please be advised that you are in violation of the SB 418 statutory rules and that the penalties outlined in SB 418 apply, which allows us to demand up to 100% of contracted rates and 18% interest as a penalty amount. |
| ☐ | 9 | If SB 418 applies and has been violated: "You are in violation of SB 418 and all penalties apply. Please be advised that per SB 418 you may request additional information from a 3rd party. If you request information from a 3rd party, you must notify us of the request. You deadline is not suspended for request for information from 3rd parties. Please be advised that since you are in violation of SB 418 statutory rules, that the penalties outlined in SB 418 apply, which allows us to demand up to 100% of the contracted rate and 18% interest as a penalty amount. |

FIG. 8P

Required Notations:

Questions:

1 - Who was the payment issued to?
2 - Where was the payment sent?
3 - What is the payment identification or check # and amount?
4 - When was the check mailed?
5 - If bulk payment, what was the payment identification # and the total amount?
6 - Has check been cashed?   ◯ Yes  ◯ No
7 - IF the check is issued and cashed, request (front and back) copy of check (ideally emailed or faxed, mail only if necessary)   ☐
8 - IF the check was released over 15 days ago, request check to be reissued immediately. (If the answer is no, then refer to the statement of law below)
9 - Additional Information and Notes

Statement of Law:

CollectLogix Copyright © 2006 Six Sigma Systems, Inc. All Rights Reserved

FIG. 8Q

NEW QUESTION

| Question ID | Question | | |
|---|---|---|---|
| 1 | Why is the claim in Appeal? | Edit | Delete |
| 2 | What is the fax # or physical address to submit appeal? (ideally faxed, mail to physical address only if necessary) | Edit | Delete |
| 3 | Request records needed for an appeal. Select the appropriate detail from the checklist. | Edit | Delete |
| 4 | What is the reference # or claim # or interim bill #? | Edit | Delete |
| 5 | If busy -- call information for direct number. | Edit | Delete |
| 6 | Make 3 call attempts | Edit | Delete |
| 7 | Look up correct number (1 Other accounts, 2. Web address, 3. Patient, 4. HR department employer, 5. Physician office) | Edit | Delete |
| 8 | Note correct number in HBO/Meditech | Edit | Delete |
| 12 | What is your definition of "in-process" or "pending"? | Edit | Delete |
| 13 | Do you have all the information needed to process this claim? | Edit | Delete |
| 14 | What is the date of claim receipt? | Edit | Delete |
| 15 | What is the date that processing is to be completed and the date the claim will be paid? (Date provided must be in 30 days of claim date receipt) If representative isnt willing to help meet this requirement, request to speak to a supervisor | Edit | Delete |
| 16 | What is the date of the claims that are currently being processed? | Edit | Delete |
| 18 | Where should the claim be submitted? (ideally emailed or faxed, mail to physical address if necessary) | Edit | Delete |
| 19 | Is there any other information required to process the claim for prompt payment? | Edit | Delete |
| 20 | If the claim is submitted electronically, is there a problem with your clearinghouse? | Edit | Delete |

FIG. 8R

NEW QUESTION REGISTRATION

Question:

Answer:

Question Answer Type: Please select a question answer type

Is Question Mandatory?

Save

CollectLogix Copyright © 2006 Six Sigma Systems, Inc. All Rights Reserved

FIG. 8S

EDIT QUESTION

Question: Why is the claim in Appeal?

Answer:

APPEAL REASON:

Text Area

Question Answer Type:

Is Question Mandatory? ☑

Update

CollectLogix Copyright © 2006 Six Sigma Systems, Inc. All Rights Reserved

NEW REQUIRED NOTATION

| FC | Notation ID | Notation | | |
|---|---|---|---|---|
| MZ | 1 | Name of payer representative who provided the information | Edit | Delete |
| MZ | 2 | Any information from Schumpert needed to process the claim | Edit | Delete |
| MZ | 3 | Date of claim receipt by payer | Edit | Delete |
| MZ | 4 | Date of expected payment | Edit | Delete |
| MZ | 5 | Supervisor name (if necessary) | Edit | Delete |
| MZ | 6 | Response the statement of law | Edit | Delete |
| MZ | 7 | Reference # or claim # | Edit | Delete |
| MZ | 8 | Correct mail address or fax | Edit | Delete |
| AC | 9 | Who am I speaking with please? | Edit | Delete |

CollectLogix Copyright © 2006 Six Sigma Systems, Inc. All Rights Reserved

FIG. 8U

NEW LAW STATEMENT

| Law Statement ID | Law Statement | | |
|---|---|---|---|
| 3 | If SB 418 applies: "Senate Bill 418 states that you must take action within 45 days of receipt of a non-electronically submitted claim, and within 30 days of receipt of a claim submitted electronically. Prior to expiration of the statutory deadline you must either pay the entire contracted amount, deny the claim, pary part of the claim and deny or audit the remainder and pay 100 percent of the applicable contracted portion, notify us that the claim is being audited and pay 100 percent of the applicable contracted rate or notify us that the claim is defiient. | Edit | Delete |
| 5 | Please be advised that under SB 418 you may only make one request per claim, limited to the patients medical record or billing records. We will be glad to provide the information you requested to you. Please be further advised that you must act within 15 days of receipt of the information or within the statutory prompt pay rules, whichever is later. IF THIS IS A SECOND / THIRD INFORMATION REQUEST: Please be advised that you are in violation of SB418 stating that you may only make 1 request for additional information. IF IT HAS BEEN MORE THAN 15 DAYS SINCE RECEIPT OF ADDITIONAL INFORMATION / VIOLATION OF STATUTORY RULES: Please be advised that you are in violation of SB 418 and that the penalties outlined in SB 418 apply, which allow us to demand up to 100% of contracted rates plus 18% interest as a penalty amount. | Edit | Delete |
| 7 | If SB 418 applies: "Please be advised that under SB418, if a preauthorization has been issued, you may not deny or reduce payment or the claim for reasons of medical necessity of appropriateness unless we materially misrepresented the proposed services or substantially failed to perform the preauthorized service." IF THE STATUTORY RULES HAVE BEEN VIOLATED; "Please be advised that you are in violation of the SB 418 statutory rules and that the penalties outlined in SB 418 apply, which allows us to demand up to 100% of the contracted rates and 18% interest as a penalty amount. | Edit | Delete |
| 9 | If SB 418 applies and has been violated: "You are in violation of SB 418 and all penalties apply. Please be advised that per SB 418 you may request additional information from a 3rd party. If you request information from a 3rd party, you must notify us of the request. You deadline is not suspended for request for information from 3rd parties. Please be advised that since you are in violation of SB 418 statutory rules, that the penalties outlined in SB 418 apply, which allows us to demand up to 100% of the contracted rate and 18% interest as a penalty amount. | Edit | Delete |
| 11 | If SB 418 applies: "Please be advised that per SB 418 you must pay 100% of the applicable contracted rate and notify us of the audit in writing within the statutory (21-, 30- or 45-day) deadline. The explanation of payment must indicate that the claim is being audited. Your audit must be completed within 180 days of claim receipt, but does not suspend statutory rules outlined in SB 418." IF STATUTORY RULES ARE VIOLATED: "Please be advised that you are in violation of te SB 418 statutory rules and that the penalties outlined in SB 418 apply, which allow us to demand up to 100% of contracted rates and 18% interest as a penalty amount. | Edit | Delete |
| 13 | If SB 418 applies: "Please be advised that per SB 418 you must pay 100% of the applicable contracted rate and notify us of the audit in writing within the statutory (21-, 30-, or 45-day) deadline. The explanation of payment must indicate that the claim is being audited. Your audit must be completed within 180 days of claim receipt, but does not suspend statutory rules outlined in SB 418." Please be advised that per SB 418 you may request additional information from a 3rd party. If you request information from a 3rd party, you must notify us of the request. You deadline is not suspended for request for information from 3rd parties. IF STATUTORY RULES ARE VIOLATED: "Please be advised that you are in violation of te SB 418 statutory rules and that the penalties outlined in SB 418 apply, which allow us to demand up to 100% of contracted rates and 18% interest as a penalty amount. | Edit | Delete |

CollectLogix Copyright © 2006 Six Sigma Systems, Inc. All Rights Reserved

FIG. 8V

NEW LAW STATEMENT REGISTRATION

Statement of Law:

Save

CollectLogix Copyright © 2006 Six Sigma Systems, Inc. All Rights Reserved

FIG. 8W

NEW CHECKLIST ITEM

| Item ID | CheckList Item | | |
|---|---|---|---|
| 55 | MR - Copy of Ins Card - SMART | Edit | Delete |
| 56 | MR - Discharge Summary - SMART | Edit | Delete |
| 57 | MR - ER Report - SMART | Edit | Delete |
| 58 | MR - H&P - SMART | Edit | Delete |
| 59 | MR - Physician Notes - SMART | Edit | Delete |
| 60 | MR - Physician Orders - SMART | Edit | Delete |
| 61 | MR - Prescriptions - SMART | Edit | Delete |
| 62 | MR - Responsibility Agreement - SMART | Edit | Delete |
| 63 | MR - ST/PT/OT Notes - SMART | Edit | Delete |
| 64 | MR - Op Report - SMART | Edit | Delete |
| 65 | MR - Test Report CT Scan - SMART | Edit | Delete |
| 66 | MR - Test Report EKG - SMART | Edit | Delete |
| 67 | MR - Test Report MRI - SMART | Edit | Delete |
| 68 | MR - Test Report Pathology - SMART | Edit | Delete |
| 69 | MR - Test Report X-ray - SMART | Edit | Delete |
| 70 | MR - Visual Fields - SMART | Edit | Delete |
| 71 | MR - Other - SMART | Edit | Delete |
| 72 | MR - All - SMART | Edit | Delete |
| 73 | EOB Ins 1 - Shared Drive / File Cab | Edit | Delete |
| 74 | EOB Ins 2 - Shared Drive / File Cab | Edit | Delete |

FIG. 8X

| User Name | E-Mail | Creation Date | Password Creation Date | User Type | User Status | | |
|---|---|---|---|---|---|---|---|
| | | 9/21/2006 11:38:04 PM | 1/2/2008 4:16:12 AM | A | 1 | Edit User | Delete |
| | | 9/22/2006 12:35:40 PM | 12/10/2007 9:56:52 AM | A | 1 | Edit User | Delete |
| | | 4/4/2007 2:40:44 PM | 12/26/2007 11:07:37 AM | A | 1 | Edit User | Delete |
| | | 4/10/2007 8:58:07 AM | 12/17/2007 8:46:54 AM | M | 1 | Edit User | Delete |
| | | 4/10/2007 9:04:22 AM | 12/24/2007 8:16:49 AM | M | 1 | Edit User | Delete |
| | | 4/10/2007 9:05:25 AM | 2/12/2008 8:11:05 AM | M | 1 | Edit User | Delete |
| | | 4/10/2007 9:09:39 AM | 12/17/2007 9:15:33 AM | M | 1 | Edit User | Delete |
| | | 4/10/2007 11:16:08 AM | 12/18/2007 8:50:01 AM | M | 1 | Edit User | Delete |
| | | 4/10/2007 12:02:32 PM | 1/7/2008 8:11:31 AM | M | 1 | Edit User | Delete |
| | | 4/12/2007 10:38:55 AM | 12/17/2007 7:42:01 AM | M | 1 | Edit User | Delete |
| | | 4/12/2007 1:23:29 PM | 12/3/2007 8:32:36 AM | M | 1 | Edit User | Delete |
| | | 4/12/2007 1:42:12 PM | 1/29/2008 2:43:53 PM | A | 1 | Edit User | Delete |

FIG. 8Z

COLLECTOR ACTIVITY

Collection Depth By Team    Total Called    Qty Called last 3 days

Reason for Non-Payment

Reason For Non-payment last 7 days by payer    Reason For Non-payment last 7 days summary Reason For Non-payment last 90 days summary

Misc. Team Reports

Rollovers    Assembly Queue Status

Outstanding SMART Items    Account Balances Exceeding Ten Thousand Dollars

Denials In the Last 5 Days    Zero Balance Exceptions

Accounts Approved for Charity    HIM Work List

Non SP Accounts Without Adjustments    HIM Accounts Called in Last 3 Days

REFERENCES / HELP

Help    Telephone Numbers

CollectLogix Copyright © 2006 Six Sigma Systems, Inc. All Rights Reserved

FIG. 8ZA

CHANGE PASSWORD

Old Password

New Password:

Re-New Password:

Update

CollectLogix Copyright © 2006 Six Sigma Systems, Inc. All Rights Reserved

FIG. 8ZB

EDIT LAW STATEMENT

Statement of Law: If SB 418 applies: "Senate Bill 418 states that you must take action within 45 days of receipt of a non-electronically submitted claim, and within 30 days of receipt of a claim submitted electronically Update CollectLogix Copyright © 2006 Six Sigma Systems, Inc. All Rights Reserved
About

FIG. 8ZC

NEW NOTATION REGISTRATION

Financial Class: [Select a Financial ( ▶ ]

Notation: [                    ]

[Save]

CollectLogix Copyright © 2006 Six Sigma Systems, Inc. All Rights Reserved
About

EDIT NOTATION

Notation: [Name of payer representative who provided the information]

[Update]

CollectLogix Copyright © 2006 Six Sigma Systems, Inc. All Rights Reserved
About

FIG. 8ZE

Checklist Item: [                    ]

NEW CHECKLIST ITEM

[Save]

CollectLogix Copyright © 2006 Six Sigma Systems, Inc. All Rights Reserved
About

FIG. 8ZF

Checklist Item: [MR - Copy of Ins Card - SMART]

EDIT CHECKLIST ITEM

[Update]

CollectLogix Copyright © 2006 Six Sigma Systems, Inc. All Rights Reserved
About

FIG. 8ZG

COLLECTION INVENTORY BY TEAM

In 30 - 120+ days bucket. Inventory not placed with agency
For Source Id: All

|  | Collections WIP $$ | Collections WIP Qty | 0 - 30 Days |
|---|---|---|---|
| Team | $26,186,172.21 | 23698 | $13,634.73 |
| Aetna | $4,576,867.43 | 2393 | $0.00 |
| BC | $6,221,869.78 | 3877 | $0.00 |
| Cigna | $3,920,597.91 | 2252 | $0.00 |
| Contracts1-Government | $1,379,480.18 | 176 | $0.00 |
| Contracts2-NonGov | $49,093.40 | 39 | $0.00 |
| Medicaid | $1,572,506.69 | 4700 | $0.00 |
| Medicare | $2,922,917.75 | 2823 | $0.00 |
| SP or Agency | $3,599,426.06 | 5506 | $8,599.41 |
| Special Handling | $1,134.04 | 7 | $5,035.32 |
| United | $1,942,278.97 | 1925 | $0.00 |

ACTIVE COLLECTIONS INVENTORY BY TEAM

CALLED IN LAST 15 DAYS, Inventory not placed with agency

|  | Collections Worked $$ | Collections Worked Qty | 0 - 30 Days |
|---|---|---|---|
| Team | $598,880.91 | 236 | $0.00 |
| Aetna | $232,423.39 | 33 | $0.00 |
| BC | $151,442.94 | 54 | $0.00 |
| Cigna | $62,497.00 | 50 | $0.00 |
| Medicaid | $6,585.41 | 6 | $0.00 |
| Medicare | $86,794.63 | 36 | $0.00 |
| SP or Agency | $3,410.28 | 6 | $0.00 |
| United | $55,727.26 | 51 | $0.00 |

FIG. 9AA

| 30 - 60 Days | 60 - 90 Days | 90 - 120 Days | 120+ Days |
|---|---|---|---|
| $10,591,182.22 | $8,156,656.98 | $3,342,742.59 | $4,095,590.42 |
| $2,705,051.73 | $1,318,943.74 | $451,197.95 | $101,674.01 |
| $3,101,617.48 | $2,099,099.22 | $831,406.11 | $189,746.97 |
| $1,658,334.75 | $1,877,919.94 | $345,250.90 | $39,092.32 |
| $277,594.02 | $466,912.36 | $41,681.69 | $593,292.11 |
| $20,635.54 | $13,773.00 | $13,506.61 | $1,178.25 |
| $518,197.22 | $550,015.11 | $371,301.91 | $132,992.45 |
| $1,272,216.03 | $734,656.76 | $806,077.00 | $109,967.96 |
| $212,152.12 | $290,009.54 | $210,144.74 | $2,887,119.66 |
| $0.00 | ($308.51) | $1,093.37 | $349.18 |
| $825,383.33 | $805,635.82 | $271,082.31 | $40,177.51 |

| 30 - 60 Days | 60 - 90 Days | 90 - 120 Days | 120+ Days |
|---|---|---|---|
| $290,447.96 | $265,978.01 | $32,738.17 | $9,716.77 |
| $138,652.67 | $87,011.24 | $5,155.48 | $1,604.00 |
| $76,459.74 | $63,946.27 | $7,183.75 | $3,853.18 |
| $32,878.85 | $17,920.36 | $11,697.79 | $0.00 |
| $25.41 | $4,862.60 | $1,697.40 | $0.00 |
| $21,314.20 | $64,540.57 | $837.59 | $102.27 |
| $351.73 | $0.00 | $0.00 | $3,058.55 |
| $20,765.36 | $27,696.97 | $6,166.16 | $1,098.77 |

FIG. 9AB

ACTIVE COLLECTIONS PERCENTAGE - 14 day

| Team | Percentage $$ Worked | Percentage Qty Worked |
|---|---|---|
| Aetna | 5.08% | 1.38% |
| BC | 2.43% | 1.39% |
| Cigna | 1.59% | 2.22% |
| Medicaid | 0.42% | 0.13% |
| Medicare | 2.97% | 1.28% |
| SP or Agency | 0.09% | 0.11% |
| United | 2.87% | 2.65% |

ACTIVE COLLECTIONS PERCENTAGE - 30 day

| Team | Percentage $$ Worked | Percentage Qty Worked |
|---|---|---|
| Aetna | 85.55% | 37.53% |
| BC | 61.69% | 24.17% |
| Cigna | 83.63% | 41.92% |
| Contracts1-Government | 91.31% | 81.25% |
| Contracts2-NonGov | 90.96% | 74.36% |
| Medicaid | 42.74% | 9.66% |
| Medicare | 74.53% | 34.86% |
| SP or Agency | 28.01% | 15.66% |
| Special Handling | -62.62% | 28.57% |
| United | 62.01% | 31.01% |

ACTIVE COLLECTIONS PERCENTAGE - 45 day

| Team | Percentage $$ Worked | Percentage Qty Worked |
|---|---|---|
| Aetna | 87.08% | 45.59% |
| BC | 65.98% | 32.42% |
| Cigna | 85.73% | 45.07% |

FIG. 9B

ACTIVE COLLECTIONS PERCENTAGE - 45 day

| Team | Percentage $$ Worked | Percentage Qty Worked |
|---|---|---|
| Contracts1-Government | 95.33% | 92.61% |
| Contracts2-NonGov | 94.79% | 82.05% |
| Medicaid | 46.50% | 13.38% |
| Medicare | 80.11% | 39.04% |
| SP or Agency | 54.98% | 28.50% |
| Special Handling | -27.20% | 42.86% |
| United | 78.00% | 39.38% |

FIG. 9C

SYSTEM AND METHOD FOR COLLECTING REVENUE

INCORPORATION BY REFERENCE

This application hereby incorporates by reference patent application Ser. No. 12/039,642, entitled "System And Method For Financial Data Management And Report Generation," filed on Feb. 28, 2008, by inventors Mischa Click, Marjorie A. Green and Gokhan Aydogan (the '642 application).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to a system and method for collecting revenue that increase cash realization from accounts receivable and bad debt. More particularly the invention relates to a system and method of targeting the collection of revenues measured to have high levels of expected bad debt.

BACKGROUND

Revenue is typically generated by the provision of sales and/or services. Whereas in some financial transactions money owed is collected at the time of a purchase and/or services rendered, many transactions operate on a promise of future payment. The revenues for this latter category are typically classified as accounts receivable. Many different collection methods abound. They vary based on the circumstances of a purchase and/or service, as well as upon commonly acceptable ways to promise future payment.

A common practice employed to break down accounts receivable is to age them. Generally, accounts with a sales/transaction date less than 30 days old are classified as current. Those that are between 30 and 120 days old are classified as delinquent. Those that are older than 120 days are often written off as bad debt.

Following up on accounts receivable as they age generates transactional costs that offset revenue. Key costs associated with accounts receivable include:
1. Loss of A/R due to uncollectability of the account (complete loss of revenue) is by far the most significant cost.
2. Time value of money, loss of funds due to increased debt as a result of not having collected the revenue, typically estimated at WACC (weighted average cost of capital).
3. Cost to collect in terms of fully loaded labor and overhead.

Thus, it is economically preferable to collect revenue in accounts receivable effectively and efficiently.

Because the costs associated with collection of accounts receivable offset revenue, the emphasis often placed on collecting debt includes minimizing the costs of collection. It is typically the case that, individuals tasked with collecting revenue cannot collect all outstanding debt. As a result, a challenge in debt collection is to choose what accounts receivable to target.

A known method for selecting which accounts to target involves worklists. Typically, worklists are employed by organizations specializing in revenue recovery operations. Thus, by definition, not all factors impacting revenue recovery are considered simultaneously, leading to suboptimal use of resources.

SUMMARY

Embodiments of the invention facilitate prioritization of collection efforts for accounts receivable that result in higher collection rates than traditional techniques. Various embodiments may apply to any industry that employs debt collection professionals (collectors) to minimize realized revenue loss. Embodiments disclosed herein refer to the healthcare industry. Accordingly, the following description may contain references to payers as insurers and to accounts as patient accounts.

Per one embodiment, the present invention provides a method, comprising importing financial account information and associated financial transaction data; calculating net account balance based on gross net conversion factors and/or contractual adjustment factors; calculating priorities; assigning the accounts to one or more collectors based on a predetermined collector assignment algorithm; batching accounts; and generating a worklist for each collector, the worklist identifying a prioritization order of one or more payers for the collector to contact to collect debt, the prioritization order being based on a predetermined prioritization algorithm.

For the method, the expected bad debt index for each payer may be defined by analyzing predicted levels of expected loss due to lack of payment. The contractual adjustment factor may be defined by analyzing contracts between the payer and the service provider. The gross net conversion factor may be used in the case of account financial information and transaction detail data not reflecting contractually agreed upon discounts. The net account balance may be determined by applying the appropriate contractual adjustment factor and/or gross net conversion factor to each account. The account priority assignment may be defined by considering the last contact with the payer regarding this account, the follow-up date for next contact of the payer for this account, the appropriate probability of bad debt as obtained from the expected bad debt index calculated using historical payment performance given several input variables, the net account balance, etc. The collector assignment algorithm may include load balancing of collection activity across a predetermined set of collectors. The collector assignment algorithm may use at least one of an account characteristic, a payer characteristic, available debt collection resources, department, financial data source, names associated with the account, payer balance, service balance, account balance, account age, account status, account type, historical payment characteristics, collection activity type, time of last collection activity, and time of last payment. The method may further comprise batching a subset of the plurality of accounts. The account batching may be based upon account priority, account characteristics and payer preferences with respect to maximum hatch sizes. The step of generating the account priorities may include generating a composite priority for the subset. The step of generating the composite priority value may evaluate whether account credits or low account balances are offsetting the overall batch balance or sum of the batch balance. The generating the worklist may include prioritizing the payers based on the number of accounts a payer is managing or the maximum number of accounts a payer is willing to discuss during a single instance of contact. The method may further comprise generating a penetration report of accounts worked by collectors relative to account inventory.

Per one embodiment, the present invention provides a system, comprising an expected bad debt generator for generating an expected bad debt index table based on historical payer payment performance given certain service types and account, characteristics; a contract, modeling engine for generating contractual adjustment factors between payer and service provider; a gross net conversion generator for generating gross net conversion factors; a net balance calculating engine for calculating net account balances; a priority calculating engine for assigning priorities to accounts and batches of accounts; a collector assignment engine for assigning the accounts to one or more collectors based on a predetermined collector assignment algorithm; an account batching engine for batching together accounts; and a worklist generator for generating a worklist for each collector, the worklist identifying a prioritization order of one or more payers for the collector to contact to collect debt, the prioritization order being based on a predetermined prioritization algorithm.

For the system, the expected bad debt index of each payer may define predicted levels of expected loss for accounts and its characteristics associated with that payer, due to lack of payment. The contractual adjustment factor may be defined based on contractually agreed upon discounts between the payer and the service provider. The gross net conversion factor may be based upon historical payer data. The net balance calculation may be based upon the contractual adjustment factor and/or the gross net conversion factor. The priority calculating engine may generate a composite priority for a batch of accounts. The priority calculating engine may evaluate whether account credits or low account balances are offsetting the overall batch balance or average batch balance when generating the composite priority. The priority may be determined from one or more dates related to collection activity, the probability of bad debt, and/or the net account balance. The priority may be determined for the account and for a set of batched accounts. The collector assignment engine may include load balancing of collection activity across a predetermined set of collectors. The collector assignment engine may use at least one of an account characteristic, a payer characteristic, available debt, collection resources, department, financial data source, names associated with the account, payer balance, service balance, account balance, account age, account status, account type, types of services provided, historical payment characteristics, payer response type, time of last collection activity, and time of last payment. The worklist generator may order accounts and groups of accounts (batches) to attempt to maximize revenue generation. The system may further comprise an account batching engine for batching a subset of the plurality of accounts. The worklist generator may prioritize the accounts based on the number of accounts each collector is managing or on the maximum number of accounts each payer/debt servicer is willing to discuss during a single instance of contact. The system may further comprise a report generator for generating a penetration report of accounts worked by collectors relative to account inventory.

BRIEF DESCRIPTION OF THE DRAWINGS

FIGs. 9AA, 9AB, 9B, and 9C illustrate a penetration report generated by the debt collection system, in accordance with an embodiment of the present invention.

DETAILED DESCRIPTION

The following description is provided to enable any person skilled in the art to make and use the invention. Various modifications to the embodiments are possible, and the generic principles defined herein may be applied to these and other embodiments and applications without departing from the spirit, and scope of the invention. Thus, the invention is not intended to be limited to the embodiments and applications shown, but is to be accorded the widest scope consistent with the principles, features and teachings disclosed herein.

Embodiments of the invention facilitate prioritization of collection efforts for accounts receivable that result in higher collection rates than traditional techniques. Various embodiments may apply to any industry that employs debt collection professionals (collectors) to minimize realized revenue loss. Embodiments disclosed herein refer to the healthcare industry. Accordingly, the following description may contain references to payers as insurers and to accounts as patient accounts.

Figure 1:
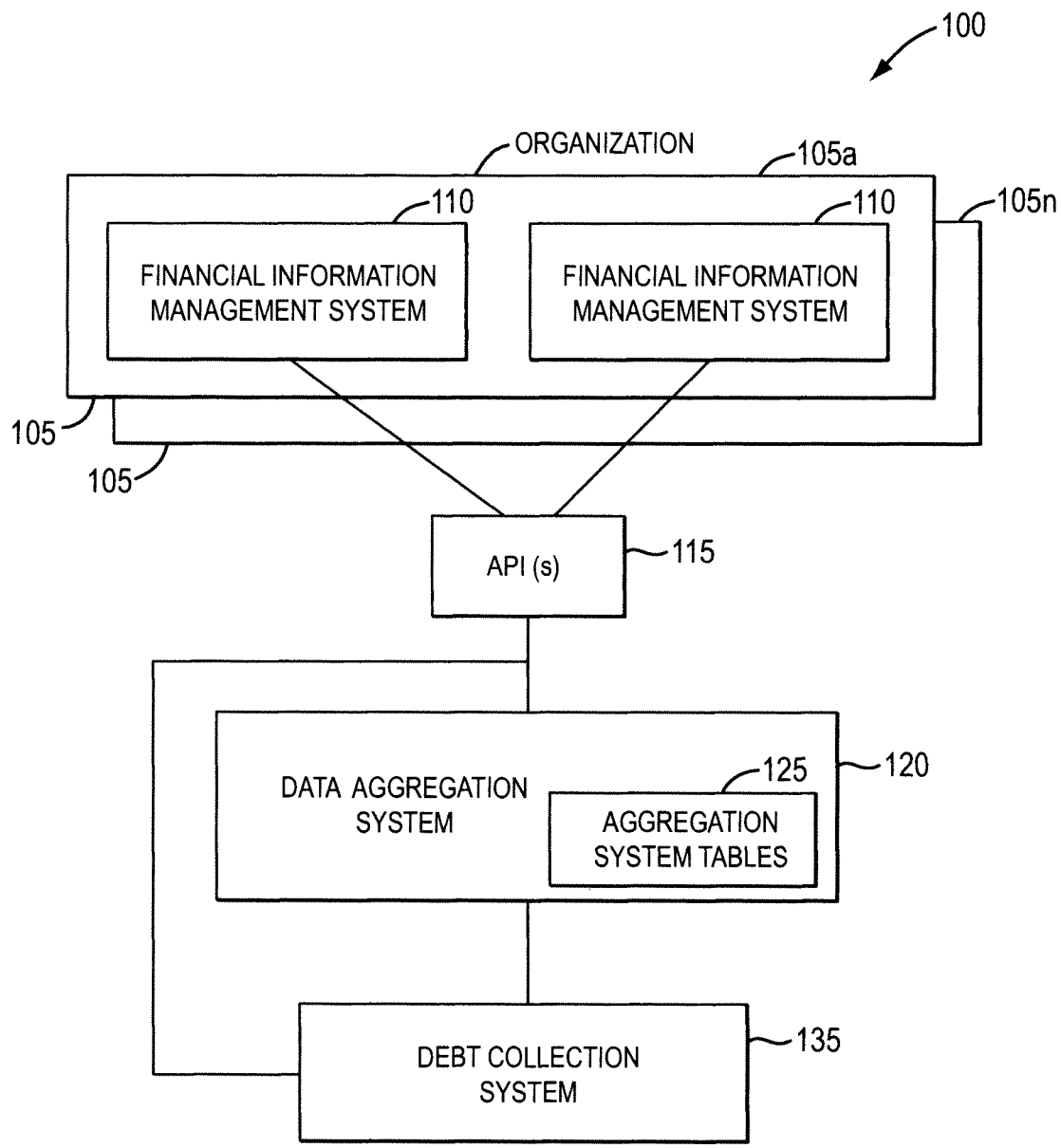
FIG. 1 is a block diagram of a financial data management network, in accordance with an embodiment of the present invention.

FIG. 1 is a block diagram of a financial data management network 100, in accordance with an embodiment of the present invention. The financial data management, network 100 includes one or more organizations 105a . . . 105n, one or more application, program interfaces (APIs) 115 coupled to the one or more organizations 105a ... 105n, a data aggregation system 120 coupled to the one or more APIs 115, and a debt collection system 135 coupled to the data aggregation system 120 and to the one or more APIs 115. The components of the financial data management network 100 may be on a single site or distributed among multiple sites.

Each organization 105 includes one or more financial information management systems 110, such as Medkech, HBOC McKesson, IDX, SAP, etc. Each financial information management system 110 includes a database of financial data including entity data (e.g., patient account data, customer account data, corporate account data, etc.), service data (e.g., services provided, sales made, dates occurred, charges involved, etc.), service provider notes (e.g., doctor notes, nurse notes, salesman notes, etc.), invoice data (e.g., invoice amounts, dates mailed, etc.), payment data (e.g., monies received at time of service, adjustments placed on the account to reflect contractual agreements, insurance fees received, dates received, etc.), refund data (e.g., monies refunded to a customer, etc.), adjustments data (e.g., modifications to the charges, etc.), insurance data, denial data (e.g., denial of insurance data, bounced check data, etc.), entity group data (e.g., data on the structure of the organization, etc.), collection agency data (e.g., identification of collection agencies and accounts transferred to them, etc.), etc. A financial information management system 110 may contain the financial data for the entire organization 105, for a predetermined subgroup (e.g., single region, single facility, single department, single team, etc.) within the organization 105, for portions of one or more groups, etc. it is understood that different financial information management systems 110 may store different financial data.

Each API 115 includes hardware, software and/or firmware for enabling communication with one or more financial information management systems 110. Each API 115 may be customized/configured for a particular financial information management system 110, or for a particular protocol and/or format. For example, if a single organization 105 uses different financial information management systems 110, each implementing a different system protocol and/or format, multiple APIs 115 may be needed to communicate with the different financial information management systems 110 of the single organization 105.

The data aggregation system 120 includes hardware, software and/or firmware for gathering the financial data via the API(s) 115 from die financial information management systems 110, and for generating usable data structures according to a predetermined standard. In one embodiment, the data aggregation system 120 stores the financial data received from the API(s) 115 in a Microsoft SQL Server database or data warehouse. If financial data is missing from a financial information management system 110, other sources may be used.

The data aggregation system 120 may use a data transformation package, such as SQL Server 2005 Integration Services, to normalize the financial data from the different financial information systems 110 to a predetermined standard and to load the normalized financial data into SQL Server database "aggregation system" tables 125. In one embodiment, the aggregation system tables 125 includes a transaction table 125 (which contains a record for each transaction) and an account table 125 (which contains a record for each account, e.g., encounter or charge set).

From the transaction data in the transaction table 125 and account data in the account table 125, the data aggregation system 120 generates age-based aggregation tables 125 including an "aging table" which contains financial transactions and/or accounts aggregated by age (e.g., by time period such as week, month, year, etc.) and transaction type (e.g., charge, payment, refund, adjustment, denial, etc.).

The debt collection system 135 includes hardware, software and/or firmware for examining account characteristics, payer characteristics, and other characteristics to facilitate collector selection, to generate dynamically changing prioritized worklists for payer contact, to facilitate information gathering and storage, etc. In one embodiment, the debt collection system 135 obtains the account and transaction information via the APIs 115. Additional details of the debt collection system 135 are shown and described with reference to FIG. 4.

Figure 2:
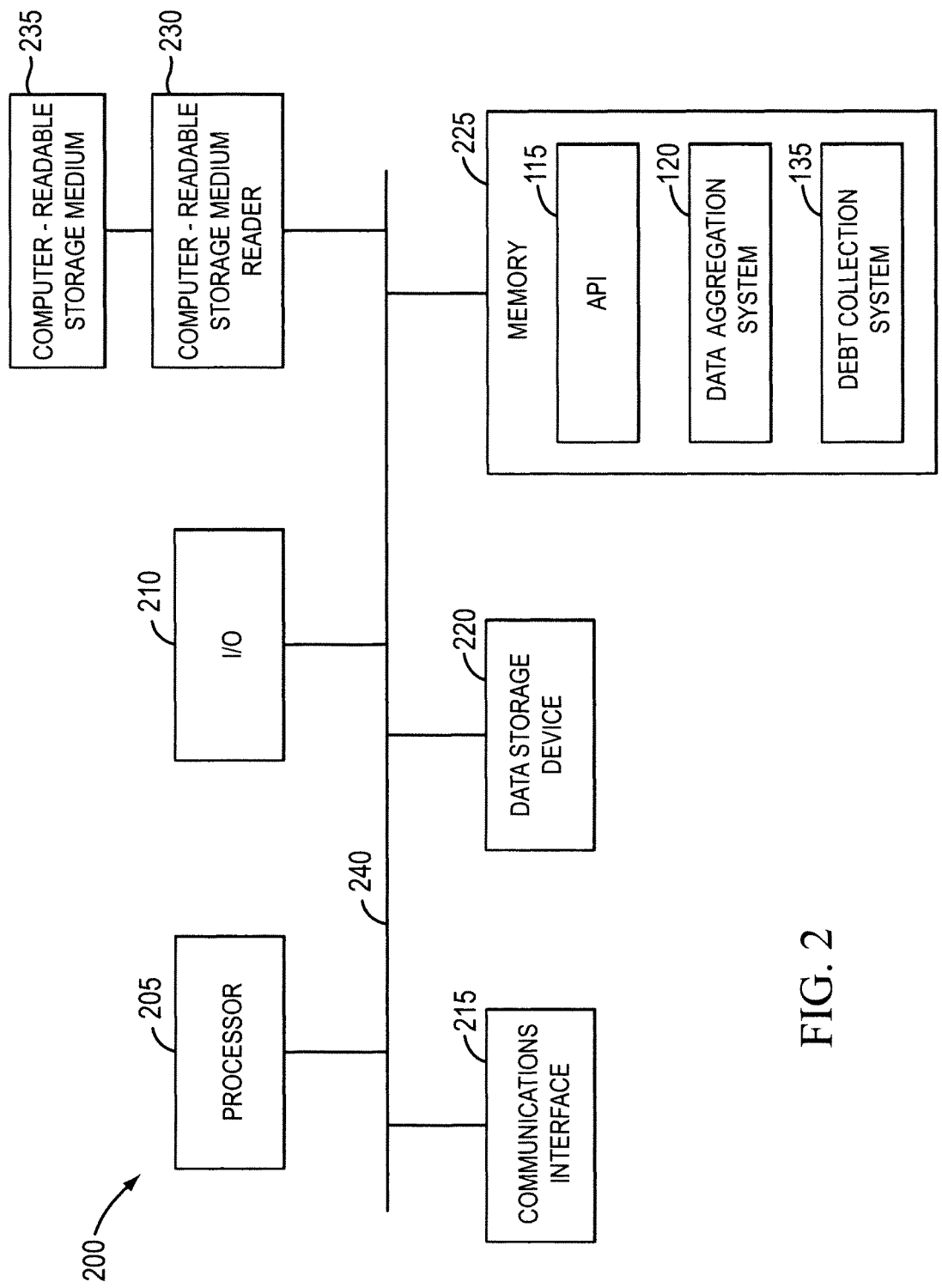
FIG. 2 is a block diagram illustrating details of a computer system operative to provide financial data management and facilitate debt collection, in accordance with an embodiment of the present invention.

FIG. 2 is a block diagram illustrating details of a computer system 200 operative to provide financial data management and to facilitate debt collection, in accordance with an embodiment of the present invention. Computer system 200 includes a processor 205, such as an Intel Pentium® microprocessor or a Motorola Power PC® microprocessor, coupled to a communications channel 240. The computer system 200 further includes an input/output devices 210 such as a keyboard, mouse and a flat panel display. The computer system 200 further includes a communications interface 215, a data storage device 220 such as a magnetic disk, and memory 225 such as random-access memory (RAM), each coupled to the communications channel 240. The communications interface 215 may be coupled to a network such as the wide-area network commonly referred to as the Internet. One skilled in the art will recognize that, although the data storage device 220 and memory 225 are illustrated as different units, the data storage device 220 and memory 225 can be parts of the same unit, distributed units, virtual memory, etc. Further, it will be appreciated that the term "memory" herein is intended to cover all data storage media whether permanent or temporary.

The data storage device 220 and/or memory 225 store the API(s) 115, the data aggregation system 120, and the debt collection system 135. The data storage device 220 and/or memory 225 may also store an operating system (not shown) such as the Microsoft Windows XP, Linux, the IBM OS/2 operating system, the MAC OS, and/or UNIX operating system. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 200 may also include additional components, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 230 such as a magnetic disk drive, hard disk drive, magneto-optical reader, CPU, etc. may be coupled to the communications channel 240 for reading a computer-readable storage medium (CRSM) 235 such as a magnetic disk, a hard disk, a magneto-optical disk, RAM, etc. Accordingly, the computer system 200 may receive programs and/or data via the CRSM reader 230.

Figure 3:
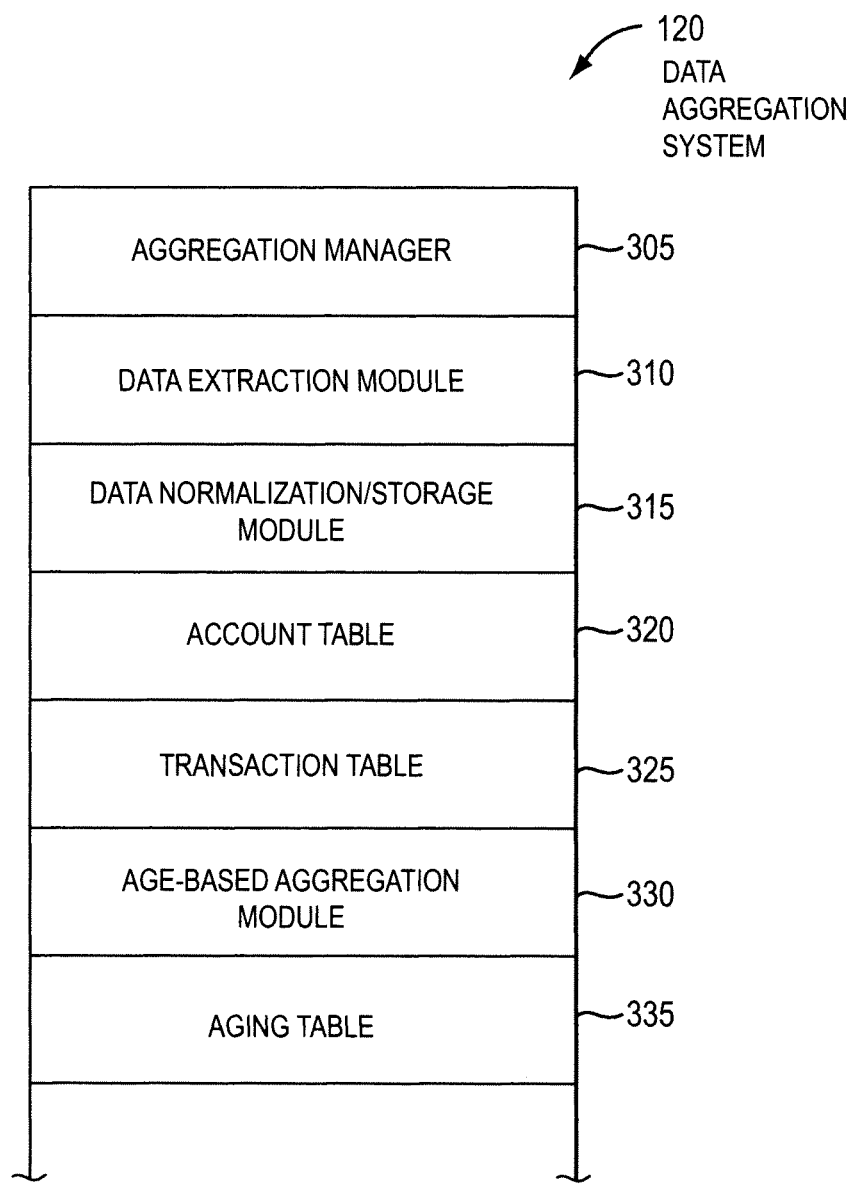
FIG. 3 is a block diagram illustrating details of the data aggregation system of FIGS. 1 and 2, in accordance with an embodiment of the present invention.

FIG. 3 is a block diagram illustrating details of the data aggregation system 120, in accordance with an embodiment of the present invention. Data aggregation system 120 includes an aggregation manager 305, a data extraction module 310, a data normalization/storage module 315, an account table 320, a transaction table 325, an age-based aggregation module 330, and an aging table 335.

The aggregation manager 305 cooperates with the data extraction module 310 to control data retrieval from the financial information management system(s) 110. The aggregation manager 305 may retrieve financial data on a periodic basis (monthly, weekly, daily, every 10 minutes, etc.), upon request, at predetermined times (e.g., at 5 pm on weekdays), after predetermined events (e.g., after 10 new entries are input into the financial information management system 110), and/or other schedule. The aggregation manager 305 may instruct the data extraction module 310 to retrieve data from different financial information management systems 110 at different times.

The aggregation manager 305 cooperates with the other components to control generation and regeneration of the aggregation tables 125. The aggregation manager 305 may generate the aggregation tables 125 on a periodic basis, upon request, at predetermined times, after predetermined events, anchor per other schedule. The aggregation manager 305 may control aggregation table generation and regeneration according to a different schedule than the schedule of financial data retrieval from the financial information management system(s) 110. The aggregation manager 305 may control aggregation table generation and regeneration upon receiving financial data from one or more of the financial information management systems 110, and need not wait until all new financial data has been retrieved from each and every financial information management system 110. It will be appreciated that the aggregation table generation and/or regeneration may occur on a regular basis so that report generation can be done without requiring concurrent aggregation table generation and/or regeneration.

The data extraction module 310, upon instruction from the aggregation manager 305, communicates with the API(s) 115 to retrieve financial data from the financial information management system 130. Tire data extraction module 330 forwards the data to the data normalization module 315.

The data normalization/storage module 315 converts financial data received from the data extraction module 310 to a predetermined standard/format, e.g., to a specific calendar, clock, currency, terminology, etc. The data normalization/storage module 315 then stores the normalized financial, data in the account table 320 and transaction table 325.

The account table 320 includes account records, each record including account data for a particular encounter (which may include information about a set of charges for a particular event). For example, account data may include customer name, contact data, customer type, insurance data, contractual information, discharge date, order date(s), invoice date, shipping date(s), etc.) for an entity. In one embodiment, all charges incurred are tied to a single account (e.g., encounter).

The transaction table 325 includes transaction records, each record identifying a particular transaction (e.g., payment, adjustment, refund, or denial) and its type (e.g., payment type, adjustment type, refund type or denial type).

Figure 7:
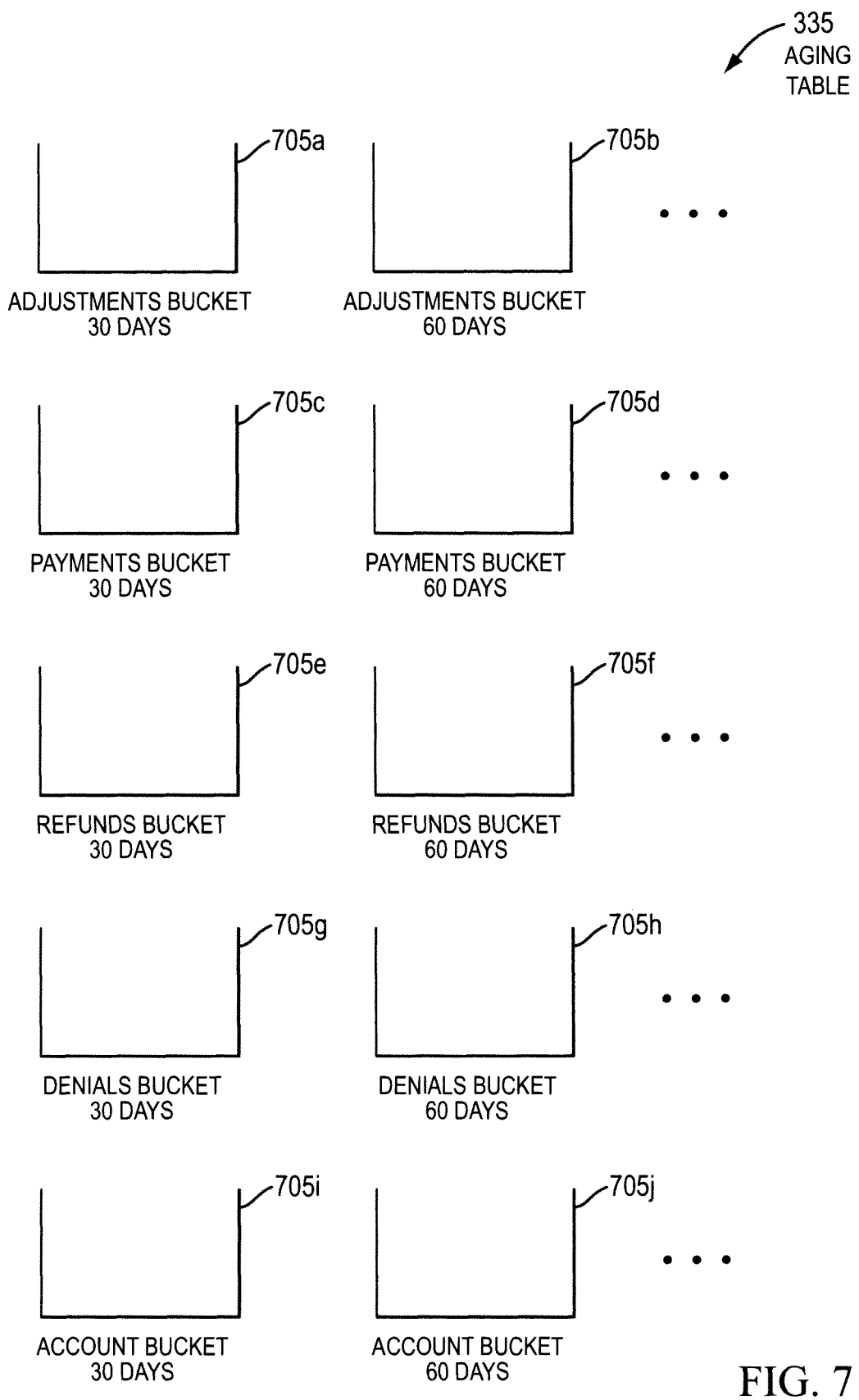
FIG. 7 illustrates an example aging table, in accordance with an embodiment of the present invention.

The age-based aggregation module 330 aggregates the transactions and/or accounts and stores the age-based financial data, in the aging table 335. An example aging table is shown in FIG. 7. In one embodiment, the age-based aggregation module 330 aggregates transactions based on transaction type and on age relative to an aging date. Example aging dates for aging an account and/or a transaction include invoice date, transaction date, patient discharge date, date of final bill, sale date, shipment date, customer receipt date, raw material purchase date, etc. The age-based aggregation module 330 may be configured to age transaction records based on one or more aging dates that represent the time when account receivables begin to age. In one embodiment, the age-based aggregation module 330 separately ages transactions for an account based on one or more single dates, e.g., patient discharge date, transaction date, and date of final bill. Aging transactions separately by different dates provides different types of aging information, each type useful as measures of financial progress.

In one embodiment, the age-based aggregation module 330 places the accounts and transaction records into aging buckets. Accounts may be placed into aging buckets in one manner; transactions in a second manner. Age-based aggregation module 330 may place accounts into aging buckets relative to the present date. For example, if the difference between the present date and the aging date is greater than 29 days and less than 60 days, age-based aggregation module 330 may add the account to a bucket designated for 30-day old accounts. Age-based aggregation module 330 may place transactions into aging buckets relative to their transaction date. Aging buckets for transactions may further correspond to transaction type. For example, if the difference between the transaction date and the aging date is less than 31 days for an adjustment transaction, then the age-based aggregation module 330 may add the adjustment transaction record to a bucket designated for adjustments at day 30. If the difference between the transaction date and the aging date is greater than 30 days and less than 61 days for an adjustment transaction, then the age-based aggregation module 330 may add the adjustment transaction record to a bucket designated for adjustments at day 60, and so on. The age-based aggregation module 330 applies similar techniques for each transaction type (e.g., payments, refunds, denials, etc.) and examined age. In one embodiment, the age-based aggregation module 330 adds transaction records to buckets by transaction type at days 30, 60, 90, 120, 150, 180, 210, 240, 270, 300, 330, 360, 390, 420, 450 and 480, relative to the aging date.

In one embodiment, the age-based aggregation module 330 places transaction records into aging buckets based on transaction type and date ranges (as opposed to age). For example, the age-based aggregation module 330 may place all adjustment transactions that occur between 30 and 90 days of an aging date into a bucket for adjustment transactions for that determined aging time period.

In one embodiment, the age-based aggregation module 330 places transaction records into buckets based on additional criteria other than or in addition to age and/or transaction type. For example, the age-based aggregation module 330 may place adjustment transactions that are not deemed write-offs to charity into a bucket. Or, the age-based aggregation module 330 may place payment transactions that are personal payments (e.g., payments not made by an insurance carrier or government agency such as Medicare) into a bucket. Or, the age-based aggregation module 330 ages transactions according to account state. For instance, the age-based aggregation module 330 may age transactions and/or accounts relative to the aging date if the account status indicates that a final bill has been created for the account or if the account status indicates that the associated account has been discharged.

Although the embodiments above have been described as generating a bucket for a single transaction type, the age-based aggregation module 330 may generate a bucket that combines transaction types, e.g., by placing the net amount owed (i.e., subtracting the sum of all payments and adjustments from total, charges) into a bucket.

It will be appreciated that financial information has different relevance and importance across industries. Accordingly, the specifics of the age-based aggregation module 330 may depend on the industry. For instance, in healthcare, revenue is often reduced under contract with payers, such as insurance companies. Since full revenue will not be collected under an insurance contract, such factors may be taken into account. For example, when calculating net account balance owed in the healthcare industry, the age-based aggregation module 330 may apply a contractual adjustment factor and/or a gross net conversion factor that reflects the contractual reduction in revenue. These adjustments to the account balance are advantageous whenever there is a mix of contractualized and non-contractualized accts to make the comparison of account balances for collection prioritization purposes, apples to apples. As another example, the originating information financial management system may have determined a contractual adjustment factor based on modeled contract terms that are already applied to the account, in which case the aggregation module 330 may not apply the gross net conversion factor.

Figure 4:
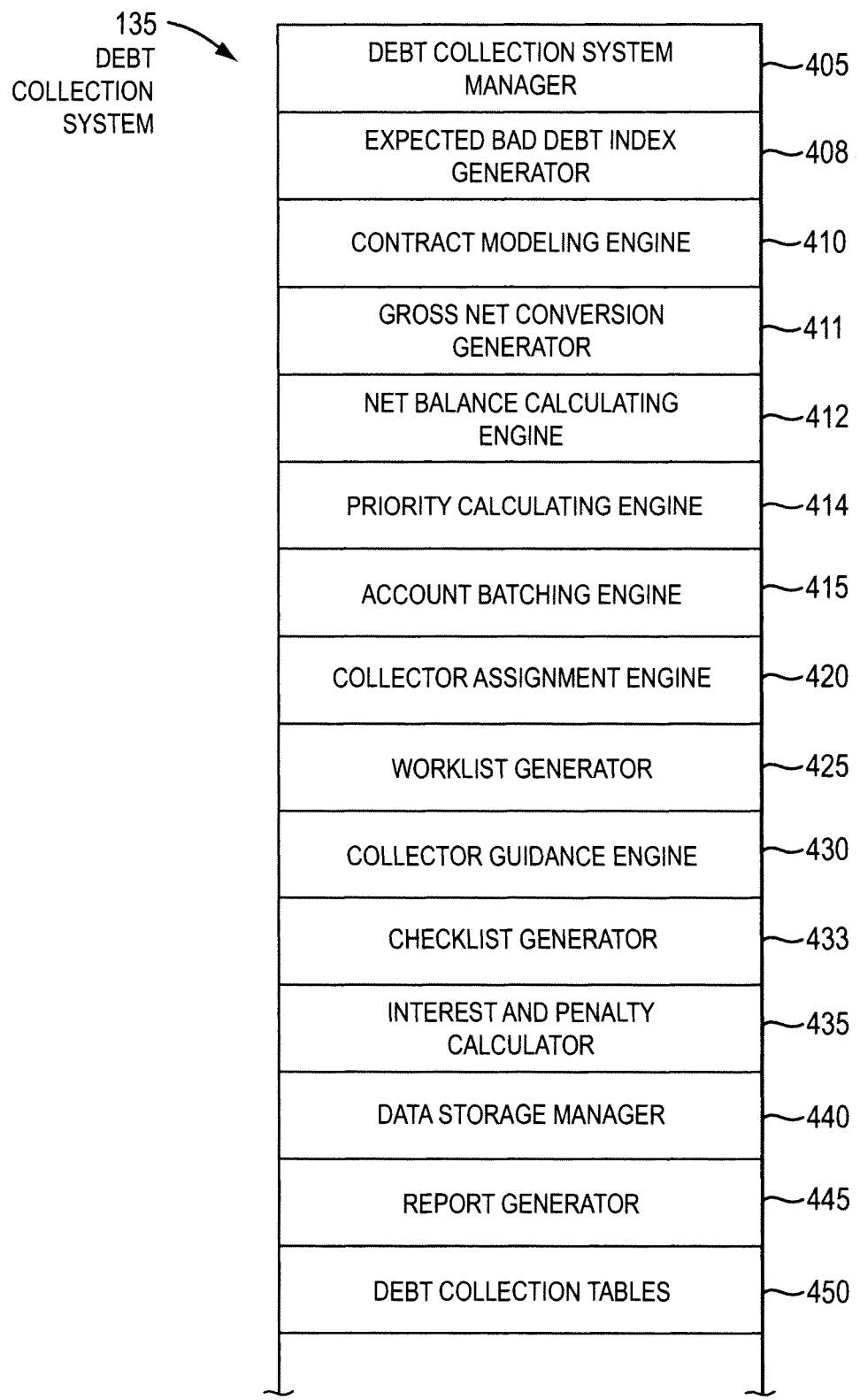
FIG. 4 is a block diagram illustrating details of the debt collection system of FIGS. 1 and 2, in accordance with an embodiment of the present invention.

FIG. 4 is a block diagram illustrating details of the debt collection system 135, in accordance with an embodiment of the present invention. The debt collection system 135 includes a debt collection system manager 405, an expected bad debt index generator 408, a contract modeling engine 410, a gross net conversion generator 411, a net balance calculating engine 412, a priority calculating engine 414, an account batching engine 415, a collector assignment engine 420, a worklist generator 425, a collector guidance engine 430, a checklist generator 433, an interest and penalty calculator 435, a data storage manager 440, a report generator 445, and debt collection tables 450.

The debt collection system manager 405 cooperates with the other components to control timing of expected bad debt index generation, contract modeling generation, gross net conversion factor generation, net account balance calculation, priority calculation, account batching, collector assignment, worklist generation, collector guidance, checklist generation, interest and penalty calculation, data storage, report generation, etc. The debt collection system manager 405 may initiate protocols on a periodic basis (monthly, weekly, daily, etc.), upon request, at predetermined times (e.g., at 5 pm on weekdays), after predetermined events (e.g., after 10 new entries are input into the financial information management system 110), and/or other schedule. Each of the components need not be initiated at the same time or according to the same schedule.

The debt collection system manager 405 may employ a secured user interlace to provide user access to functions such as the worklists, non-payment scenarios, checklists, notes, reports, and other collection information. Embodiments of the user interface may enable management of account and payer information. Embodiments of the user interface may provide access to an explanation of benefits (EOBs), payer images, payer specific documents including appeal letters, etc.

In one embodiment, the debt collection system manager 405 obtains account debt criteria, e.g., account balance, account age, payer data, historical payment data, etc., from the data aggregation system 120, e.g., from the aggregation system tables 125. In one embodiment, the debt collection system manager 405 obtains account debt criteria from the financial information management system 110, possibly using the API(s) 115. The debt collection system manager 405 may obtain a portion of the account debt criteria from the data aggregation system 120 and a portion of the account debt criteria from the financial information management system 110. Other methods are also possible.

The expected bad debt index generator 408 generates an expected bad debt index table 450. One or more expected bad debt index records may be generated for each set of payers, service type, and/or account characteristics. Each table record may include a payer identifier, service type identifiers, account characteristics, an aging criterion, and a probability of bad debt. Broadly speaking, the expected bad debt index table records may be used to prioritize collection efforts on accounts associated with the payers on the table and allow debt collection professionals to focus efforts towards revenue loss minimization. Prioritizing accounts has the advantage of directing limited resources towards collection activity to maximize realization. In one embodiment, the expected bad debt index generator 408 generates the expected bad debt index table 450 by analyzing historical levels of loss due to lack of payment associated with each payer, service type, and account characteristics. The probability of bad debt may be generated based on payer characteristics, historical payment characteristics, service type, account characteristics, etc.

In one example embodiment, the expected bad debt index generator 408 evaluates historic bad debt percentages by payer and age bucket stored in a historical debt percentage table 450 to generate the expected bad debt index table 450. For example, the bad debt index generator 408 may track several months of accounts to identify historic information on the payer. For example, assume as follows:

Total net revenue for an account at day 0 is $1000.
By Day 30, there is $500 payment, leaving a net account balance of $500.
By Day 60, there is another $300 payment, leaving a net account balance of $200.
At Day 120, the remaining net account balance of $200 becomes bad debt.

The expected bad debt index generator 408 generates an historical bad debt percentage, based on this account, as follows:

For this payer, $200/$1000, or 20% of the net account balance, is predicted to go to bad debt.
For the first time interval, the percentage is calculated as $200/$500, which is 40%.
For the second time interval, the percentage is calculated as $200/$200, which is 100%.

This type of analysis may be repeated for each account with the same payer in a designated time range. The historical liabilities and payment amounts are summed, then a global average is derived from the sums to create probabilities of bad debt associated with time intervals. If the sample size for a payer is small for the designated time range, embodiments may use a pooled residual profile.

Expected bad debt index table records are employed by priority calculating engine 414, as described below.

The contract modeling engine 410 generates a contractual adjustment table 450. One or more contractual adjustment table records are generated for each set of payers, service providers and service characteristics. Each table record may include a payer identifier, service provider, an account characteristic, and a contractual adjustment factor. The contractual adjustment table 450 may be used to provide information about correct adjustments to apply to an account. The contractual adjustment factor may be used as an alternative to the gross net conversion factor by net balance calculating engine 412 in calculating net account balance.

The gross net conversion generator 411 generates the gross net conversion table 450, which includes information about discount factors that apply to payer type, service type and account characteristics, including patient type (e.g., outpatient, in patient, long-term care patient, etc.), services rendered, length of stay, etc. The gross net conversion generator 411 generates gross net conversion table records by calculating the historic averages for those payers and discount factors where the accounts are not contractualized in accounts receivable until a later point in time. Each gross net conversion table record may include a financial liability indicator that relates to one or more payers, one or more discount factors, and a gross net conversion factor.

Contractual adjustment table 450 and gross net conversion table 450 are employed by the net balance calculating engine 412 to create an estimated net balance for each account. Account records may contain indicators of financial liability and discount factors that can be employed to extract a contractual adjustment factor from contractual adjustment table 450. Account records may contain indicators of financial liability and discount factors that can be employed to extract a gross net conversion factor from gross net conversion table 450. In one embodiment, if there is a contractual adjustment factor for the liable payer on the account, the account's net balance is adjusted by the contractual adjustment factor and the gross net conversion factor is not considered. By adjusting the account balance by the applicable contractual adjustment factor and/or gross net conversion factor, net balance calculating engine 412 creates the advantage of providing a more accurate measure for what portion of the account's balance is likely to be due from the liable party. The net account balance provides the advantage of better prioritization of accounts by priority calculating engine 414. In fact, the use of net account balance in place of account balance may be critical with payers that have mixed accounts receivables, some contractualized, some not. By employing net account balance for these payers, the priority ends up being apples to apples.

The priority calculating engine 414 assigns collection priorities to each account. The priority is based upon a number of factors, including the last date on which collections was in contact with a payer, the follow-up date set to contact the payer again, the date range in which collections activity is considered applicable to a payer, the probability of bad debt in the expected bad debt index table 450, the contractual adjustment factor in the contractual adjustment table 450, the gross net conversion factor in the gross net conversion table 450, the account age (patient discharge date), etc. In one embodiment, priority information is housed in the account record.

For example, the priority calculating engine 414 may expect the collector to call the payer every 28 days for collection on the account. Accordingly, the priority calculating engine 414 may set the priority to zero for half that time, e.g., 14 days. Then, the priority calculating engine 414 may linearly increase the priority from zero to its total priority level (based on a predetermined prioritization algorithm) over the remaining 14 days. In one embodiment, the priority calculating engine 414 operates as follows:

Identify the Last Call Date (i.e., the date the liable payer was last contacted for collection) and scheduled Follow-Up Date (e.g., 28 days later).
Generate D by dividing the difference between these dates by 2 (e.g., 14 days).
Create an Adjusted Call Date by adding D to the Last Call Date.
If the Adjusted Call Date is in the future, Priority=zero.
If the Adjusted Call Date has passed and the Follow-Up Date has not occurred, calculate a linear increase in the value of Priority as follows:
Obtain the probability of bad debt from the Expected Bad Debt Index table 450 for today (e.g., based on the account's age bucket).
Set Priority=(Net Acct Balance*Probability of Bad Debt)/Adjusted Call Date*(Adjusted Call Date−Follow-up Date−Present Date+1).
If the Follow-Up Date has passed, calculate the Priority as follows:
Calculate the probability of bad debt for today (e.g., based on the account's age bucket).
Set Priority=Net Acct Balance*probability of bad debt.

In traditional commercially available collections applications, the Follow-Up Date is fixed. Those applications do not consider the dynamic nature of collections inventory. However, because of the dynamic nature of account inventory in relation to other accounts, the priority calculating engine 414 assists the collector to predict if an account worked today should be worked in 7, 14 or 21 days. As stated above, embodiments of the invention set the Priority of an account to zero for half of the Follow-Up period. After that, for every day from the half way point to the full value, the Priority increases linearly. If the account moves to a new age bucket with a change in the probability of bad debt, the priority calculating engine 414 can change the slope of this function at that point. *Factory Physics* (2008) by Hopp and Spearman is incorporated by reference.

The collector assignment engine 420 assigns debt collection to collectors based on factors such as account characteristics, payer characteristics, available debt collection resources (such as staff, applications, etc.), etc. The collector assignment engine 420 may match accounts to the collector most closely associated with a department, account status In the collections process, account age, account type, source of financial data, names associated with the account, account balance, payer balance, service balance, time of last collection activity, time or last payment, etc. The collector assignment engine 420 may divide accounts to load balance debt collection resources. In one embodiment, collector assignment information is housed in the account record.

The account batching engine 415 batches accounts that share the same collector assignment and liable payer contact. Since there is a certain fixed cost associated with contacting a payer, it is economically beneficial to group this fixed cost over multiple accounts. In one embodiment, the account batching engine 415 may determine the batch size through knowledge of the maximum number of accounts that a payer will permit to be processed during a single contact.

In one embodiment, the account batching engine 415 may support cross-payer batching. That is, some services support multiple payers. For example, some payers outsource the administration of their plans to a single service. For instance, a service may handle Aetna and Medicare for a certain state. Accordingly, die account batching engine 415 may generate batches across multiple payers.

In one embodiment, the priority calculating engine 412 may generate a composite priority on a batch of accounts, by evaluating and/or grouping the priorities of each account within the batch. Further, the priority calculating engine 412 may dissect batches with low account balances (e.g., less than a predetermined number) or negative account balances (credits). Since batches are often chosen for debt collection based on overall batch balance, a batch of accounts having an overall batch balance or average account balance that is low or negative is often passed over in favor of other batches with higher batch balances. However, the priority calculating engine 412 may dissect a batch balance into its components to examine whether the batch balance is a sum of a significant debit balance of one liable payer and a significant credit balance of another payer. While the batch balance may be low or negative, the priority calculating engine 412 may identify a significant debit balance worthy of debt collection. Additionally, embodiments may be valuable in industries that have the potential for fluctuating account balances or portions of account balance that are percentages of others.

The worklist generator 425 generates a prioritized worklist of accounts and/or batches of accounts for each collector or debt collection resource. The worklist generator 425 may generate the worklist based on the account priority and/or composite batch priority (batch sum). In generating the worklist based upon the account priority and/or batch priority, worklist generator 425 provides the advantage of prioritizing worklists in a sequence to minimize loss of revenue and avoid redundancy (e.g., calling the same payer for the same account numerous times over a short period). The worklist generator 425 may dynamically regenerate worklists as a result of ongoing collection activity. Whenever relevant changes are identified to worklist generator 425, priority calculating engine 414 is employed to recalculate an account's priority. Then worklist generator 425 reorders the worklist as applicable, to reflect the change in account priorities.

Using the worklist generated by worklist generator 425, collectors contact payers. The collector guidance engine 430 provides collection guidance payer contact and for non-payment scenarios or other activity taken by the collector. For each non-payment scenario, the collector guidance engine 430 may provide Lists of questions to be asked of the payer, of actions to be taken, of appropriate legal verbiage to be quoted, etc. The collector guidance engine 430 may facilitate information capture, e.g., auto-generation of notes related to the questions asked of payers.

Collector guidance engine 430 then generates a note record in note table 450 using specified answer segments by concatenating the answer segment and the answer Into a standard note to be exported to the financial information management system where the account originated.

In one embodiment, the checklist generator 433 enables creation of checklists of information and/or documents to be retrieved or gathered to be supplied to the liable party. Checklist generator 433 may allow collectors to specify the account information needed and stores them in checklist item table 450. The checklist generator 433 may track each checklist request in checklist table 450 and provide a collector with status information about, the request. The checklist generator 433 may auto-generate account notes of account information requested and produced.

For example, if a payer indicates that a reason for nonpayment includes insufficient documentation, the collector may invoke checklist generator 433 to log the information requested by the payer. Checklist generator 433 creates records in checklist table 450 and checklist item table 450. Data storage manger 440 cooperates with collector guidance engine 430 to facilitate fulfillment of checklist requests through the use of checklist status fields and checklist item status fields on checklist table 450 and checklist item table 450, respectively. Check list status fields provide indications of whether a checklist request is in process, waiting on information, records or invoices, delivered to the payer, etc. Check list item status fields provide information about particular items requested by the payer, including indications of whether an item has been pulled, is in process of being pulled, is not available, etc. The advantages provided by checklist generator 433 include that it enables personnel other than collectors to fulfill payer requests for documentation, thereby allowing collectors to focus on minimizing loss of revenue.

In one embodiment, many records and documents are stored electronically and available for view by the collector during collection activity. Checklist generator 433 facilitates electronic forwarding, faxing, and/or mailing of such information without requiring other personnel to assist in the retrieval and gathering of the requested information. Checklist generator 433 indicates which documents have been transmitted to a payer for future reference by a collector.

The interest and penalty calculator 435 calculates payer interest and/or penalties assessed, e.g., based on account information, date, payer-specific contract terms, etc. The interest and penalty calculator 435 provides leverage for the collector in negotiating payment with the payer.

By employing collector guidance engine 430, collection activity is posted by data storage manager 440 in the debt collection tables 450. Many collection activities described above may result in an indication that an account has been worked. With that indication, collection guidance engine 430 invokes priority calculating engine 414 to re-priority accounts and/or batches of accounts. In one embodiment, generation of a checklist does not result in an indication that an account has been worked. Tire reason is that checklist generation may not be indicative that the checklist is the result of previous contact, not new contact. In that case, checklist activity is merely the execution of agreed upon action in the previous call, and as such insufficient to re-prioritize accounts and/or batches. As a result, an account will continue to appear on the worklist if the only action taken relates to checklist activity.

The data storage manager 440 posts information including information connected with collection activity, back to the financial information management system 110 that stores the financial data. The types of transactions posted back may match all transactions types in the resident system, e.g. payments, adjustments and transfers. The data storage manager 440 stores financial data to support business intelligence, including data mining and reporting. Financial data includes account characteristics and associated transaction information, data collected from the scenarios and checklists, etc.

The report generator 445 enables the generation of reports, e.g., summaries of accounts with high balances (e.g., accounts over $10K), summaries of accounts with recent activity, summaries of accounts for which checklists have been requested, summaries of accounts that have recently been denied payment, summaries of accounts based on reasons for nonpayment, etc. Each of these summaries may be provided for a given period of time (e.g., day, week, month, year, etc.). The report generator 445 may generate reports upon request, on a periodic basis, at predetermined times, etc. The report generator 445 may automatically send reports to various individuals based on various criteria, e.g., request, preferences, authorization, title, etc. For example, different individuals of a company many request different reports. The report generator 445 may perform security functions to prevent unauthorized persons from obtaining reports generally or particular reports.

The report generator 445 may enable generation of a report to measure inventory penetration as shown in FIGS. 9AA, 9AB, 9B, and 9C, which may be derived from a physical inventory inverse equivalent of service level. An example report that measures inventory penetration may include a graphical representation of the number and/or value of accounts worked over a given period of time (e.g., day, week, month, quarter, year, etc.) for each collector or collector team, by account age. That way, the efficiency of collectors can be evaluated. Another example report that measures inventory penetration may include a graphical representation of the number or value of the accounts paid over a given period of time for each collector. That way, the effectiveness of collectors can be evaluated. Another example report that measures inventory penetration may include a graphical representation of the total value of accounts worked or paid by all collectors relative to the entire inventory of debt over several periods of time (e.g., for each month over the past year). That way, the relative performance of the system can be evaluated. Another example report that measures inventory penetration may include a graphical representation of the number or value of current accounts worked or paid relative to the inventory of current accounts, the number or value of delinquent accounts worked or paid relative to the inventory of delinquent accounts, the number or value of bad debt worked or paid relative to the inventory of bad debt, etc. Many other reports are possible given the capabilities of the debt collection system 135.

The debt collection tables 450 includes a number of tables for facilitating and supporting collection activities, including expected bad debt index table generation, contractual adjustment table generation, gross net conversion table generation, net account balance generation, account prioritization, account batching, batch prioritization, collector assignment, worklist generation, collector guidance, checklist generation interest and/or penalty calculation, data storage, report generation, etc. An example of debt collection tables 450 are shown and described with reference to the healthcare industry example provided below.

Figure 5:
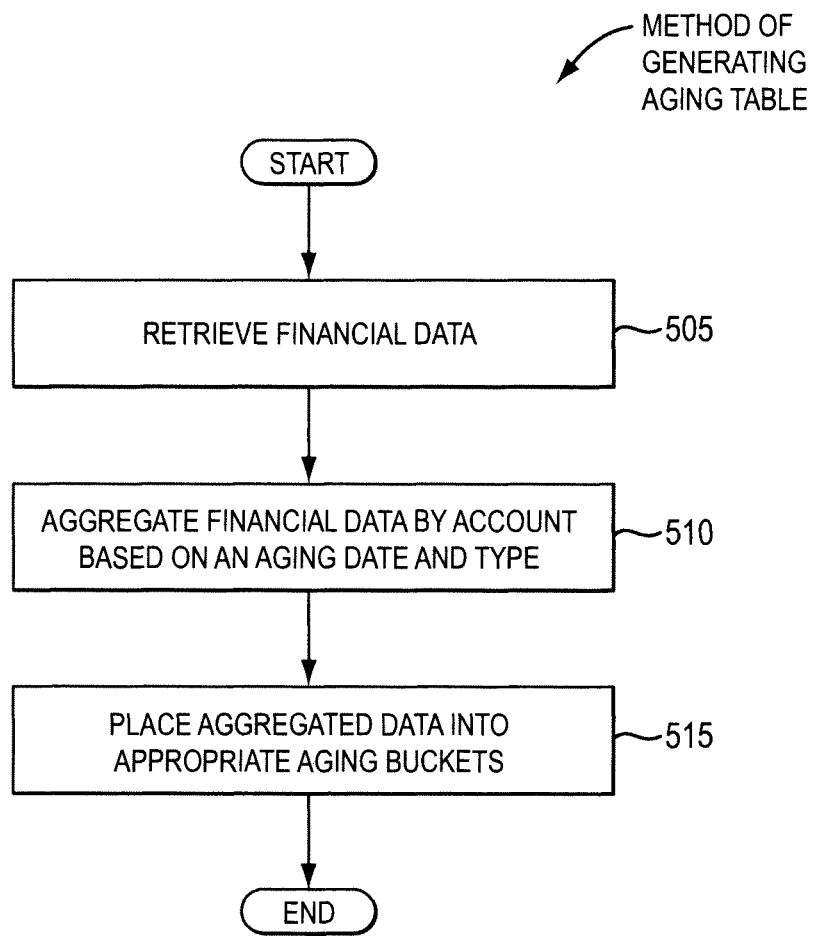
FIG. 5 is a flowchart illustrating a method of generating an aging table, in accordance with an embodiment of the present invention.

FIG. 5 is a flowchart illustrating a method 500 of generating an aging table 335, in accordance with an embodiment of the present invention. Method 500 begins with the age-based aggregation module 330 in step 505 retrieving financial data, e.g. transaction data and account data, from the transaction table 325 and account table 320. The age-based aggregation module 330 in step 510 aggregates the transaction data by account based on its age, transaction type, and/or account characteristics, such as date of discharge or date of final bill. The age-based aggregation module 330 in step 515 places the aged and aggregated data into appropriate aging buckets in the aging table 335. Method 500 then ends.

Figure 6A:
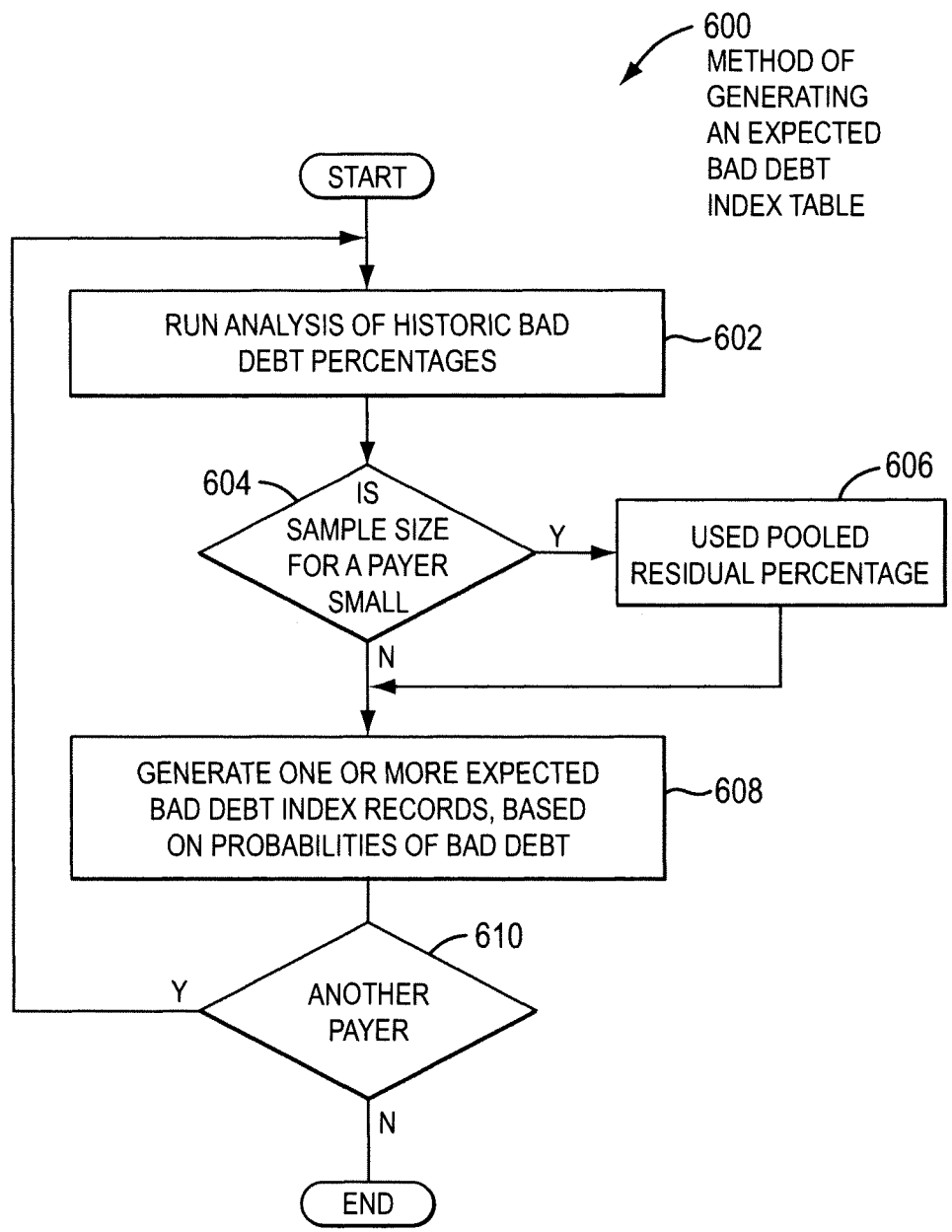
FIG. 6A is a flowchart illustrating a method of generating an expected bad debt index table, in accordance with an embodiment of the present invention.

FIG. 6A is a flowchart illustrating a method 600 of generating an expected bad debt index table 450, in accordance with an embodiment of the present invention. Method 600 begins with expected bad debt index generator 408 in step 602 running an analysis of historic bad debt percentages for a payer. The historical information employed may be stored in a historical debt percentage table 450. The information may include financial liability indicator, account age, probability of bad debt, percentage of account balance paid, service type (DRG or MSDRG, CPTs, etc.), etc. The expected bad debt index generator 408 in step 604 determines if the sample size of the historical information for a payer is small. If so, expected bad debt index generator 408 in step 604 considers pooled residual percentages associated with payers of similar size and characteristics, in place of the existing historical information associated with the payer. Pooled residual percentages may be stored in a pooled residual percentage table 450. Expected bad debt index generator 408 in step 608 generates a probability of bad debt associated with a payer based upon probability of bad debt factors, including account age, service type, and account characteristics. There may be multiple probabilities generated, based on a number of probability of bad debt factors. For each combination of payer and set of probability factors, expected bad debt generator 408 creates an expected bad debt index table record in expected bad debt index table 450. In step 610, expected bad debt index generator 408 continues this process for each payer. When all payers have been process, method 600 ends.

Figure 6B:
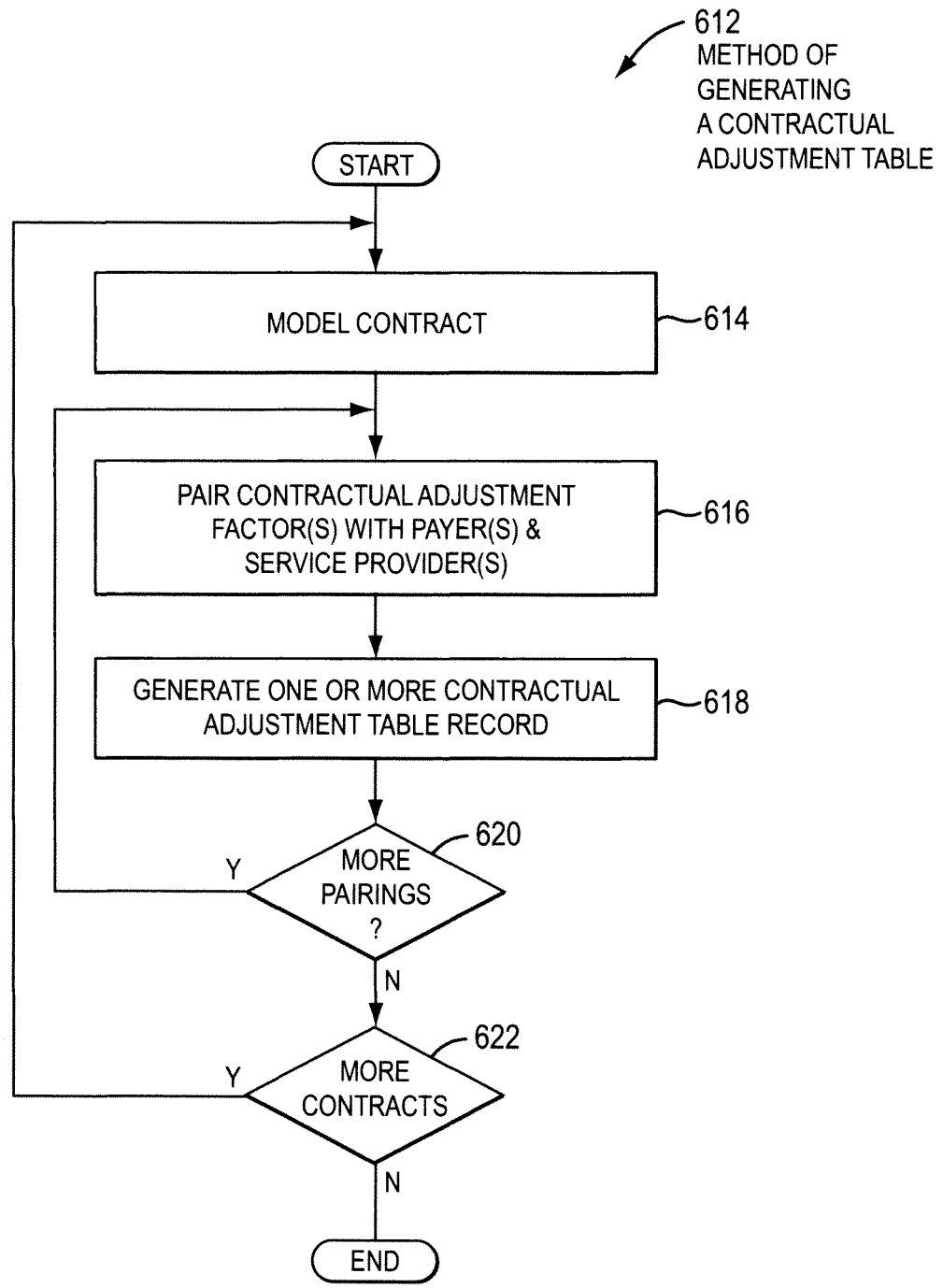
FIG. 6B is a flowchart illustrating a method of generating a contractual adjustment table, in accordance with an embodiment of the present invention.

FIG. 6B is a flowchart illustrating a method 612 of generating a contractual adjustment table 450, in accordance with an embodiment of the present invention. Method 612 begins with contract modeling engine 410 in step 614 modeling a contract between payer(s) and service provider(s). The contract modeling process may involve an analysis of the contract with respect to how contractual terms may affect the revenue collectable from services provided. The analysis may result in the generation of business rules that may include one or more contractual adjustment factors. Codification of such rules may correlate contractual adjustment factors with discounts (lump sum or percentages) that fall under the modeled contract. Contract modeling engine 410 in step 616 may pair one or more contractual adjustment factors with discounts for a combination of payer(s) and service provider(s). Contract modeling engine 410 in step 618 may create one or more contractual adjustment table records from the pair. Contract modeling engine 410 in step 620 returns to step 616 for each pairing. Contract modeling engine 410 returns to step 614 for each contract. Modeling of a contract may include the generation of many pairings and contractual table records. When all contracts have been modeled, method 612 ends.

Figure 6C:
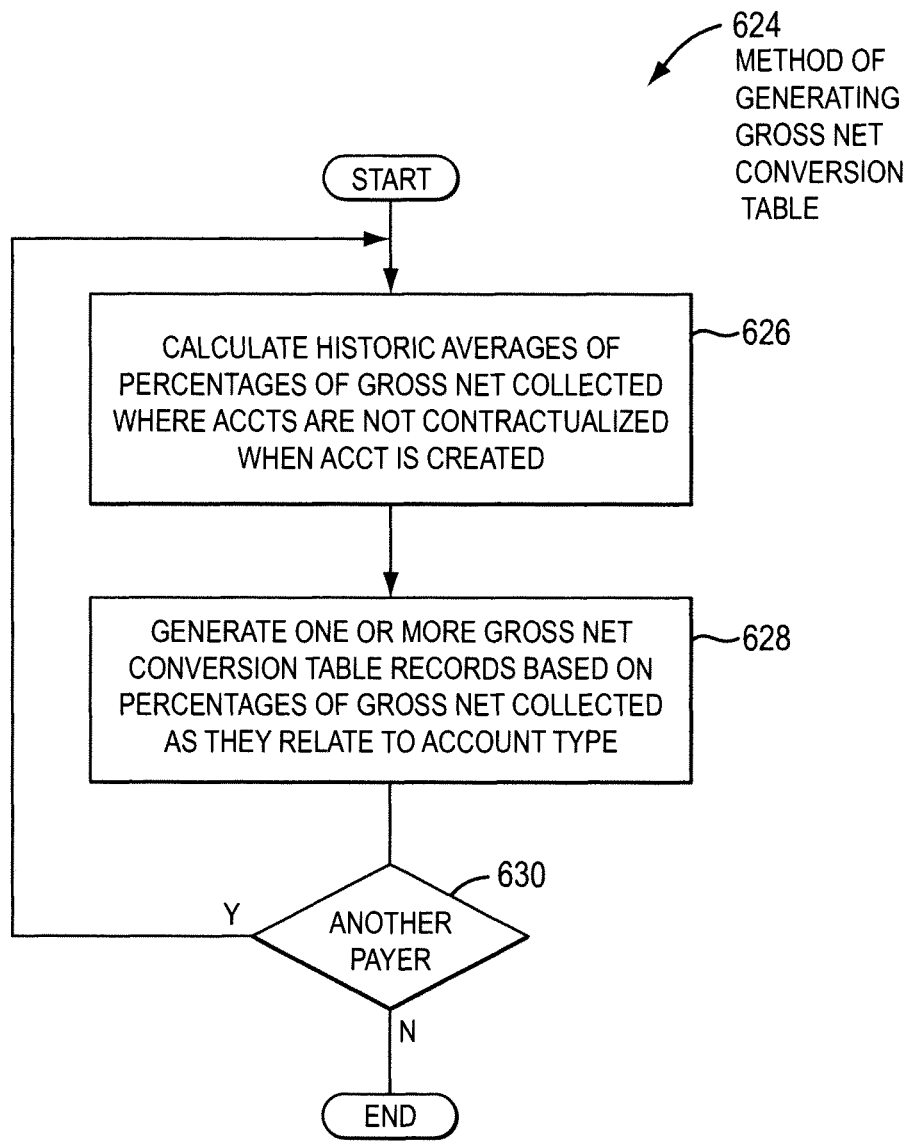
FIG. 6C is a flowchart illustrating a method of generating a gross net conversion table, in accordance with an embodiment of the present invention.

FIG. 6C is a flowchart illustrating a method 624 of generating a gross net conversion table 450, in accordance with an embodiment of the present invention. Method 624 begins with gross net conversion generator 411 in step 626 calculating historic averages of percentages of gross net collected for a payer that is not contractualized at the time an account is moved to accounts receivables. The historical information employed may be stored in a historical gross net average table 450. Gross net conversion generator 411 in step 628 generates a gross net conversion factor associated with an account type for the payer. There may be multiple gross net conversion factors generated, based on multiple account characteristics. For every gross net conversion factor and account type pair, gross net conversion generator 411 creates a gross net conversion table record in gross net conversion table. Gross net conversion generator 411 in step 630 continues this process for each payer. When all payers have been processed, method 624 ends.

Figure 6D:
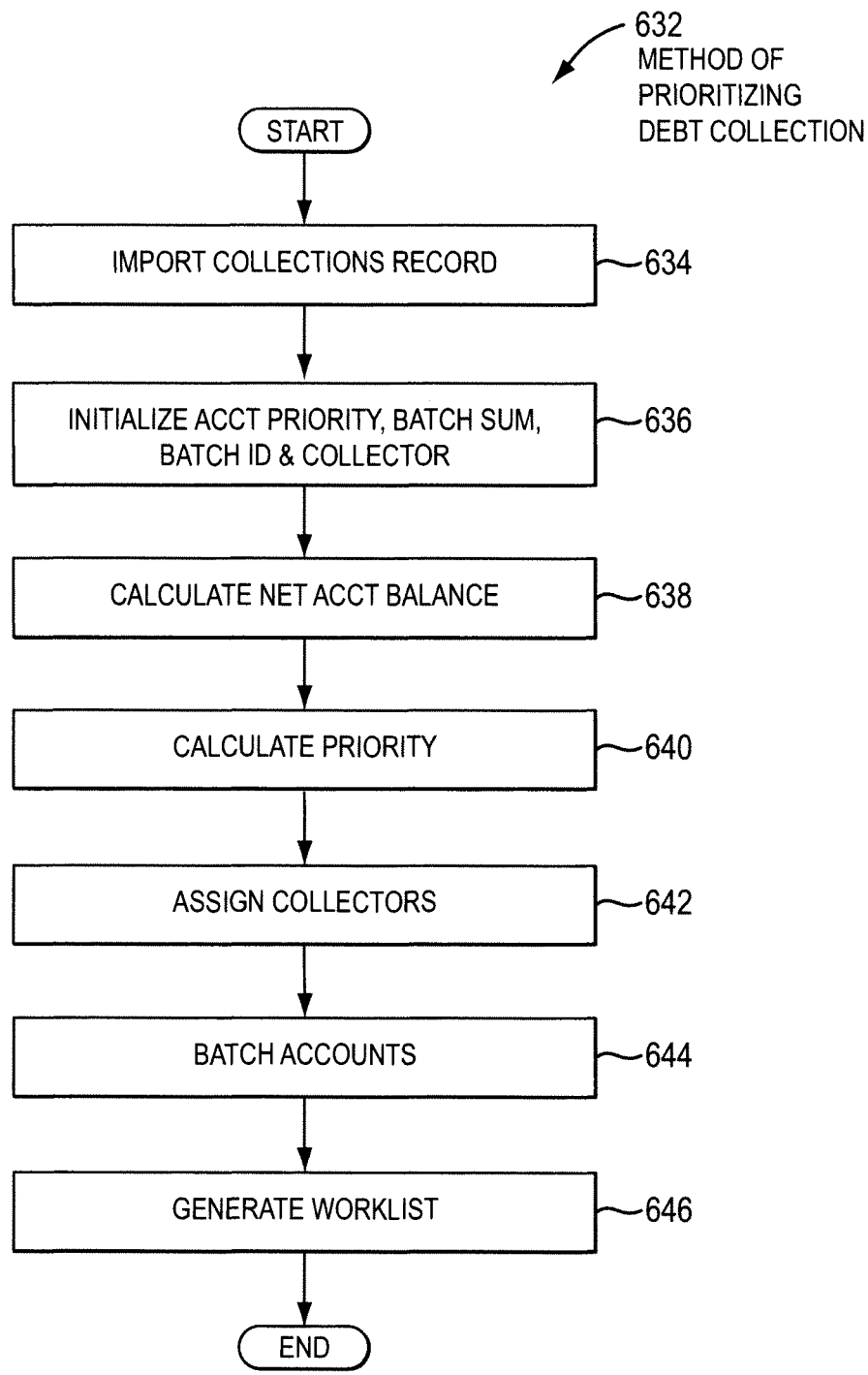
FIG. 6D is a flowchart illustrating a method of prioritizing debt collection, in accordance with an embodiment of the present invention.

FIG. 6D is a flowchart illustrating a method 632 of prioritizing debt collection, in accordance with an embodiment of the present invention. Method 632 begins with the data normalization storage module 315 in step 634 importing collections records. In step 636, debt collection system manager 405 initializes each collections record, including account priority, batch priority (batch sum), batch identifier, net account balance and collector. In step 638, net balance calculating engine 412 calculates the net balance for the account, by employing the appropriate contractual adjustment factor from contractual adjustment table 450 and/or gross net conversion factor from gross net conversion table 450. The priority calculating engine 414 in step 640 generates a priority for each account. The collector assignment engine 420 in step 642 assigns accounts to collectors, e.g., possibly based on account characteristics, payer characteristics, load balancing, etc. Account batching engine 415 in step 644 batches accounts assigned to the same collector. For example, the account batching engine 415 may group accounts according to a common liable payer, possibly up to a maximum number of accounts. In one embodiment, the priority calculating engine 414 reviews the accounts of a batch before generating a batch priority (batch sum). Account characteristics, such as account balance, account age, payer/debt servicer, etc., figure prominently in which accounts are batched together. The worklist generator 425 in step 646 generates worklists for each collector. Method 632 ends.

Figure 6E:
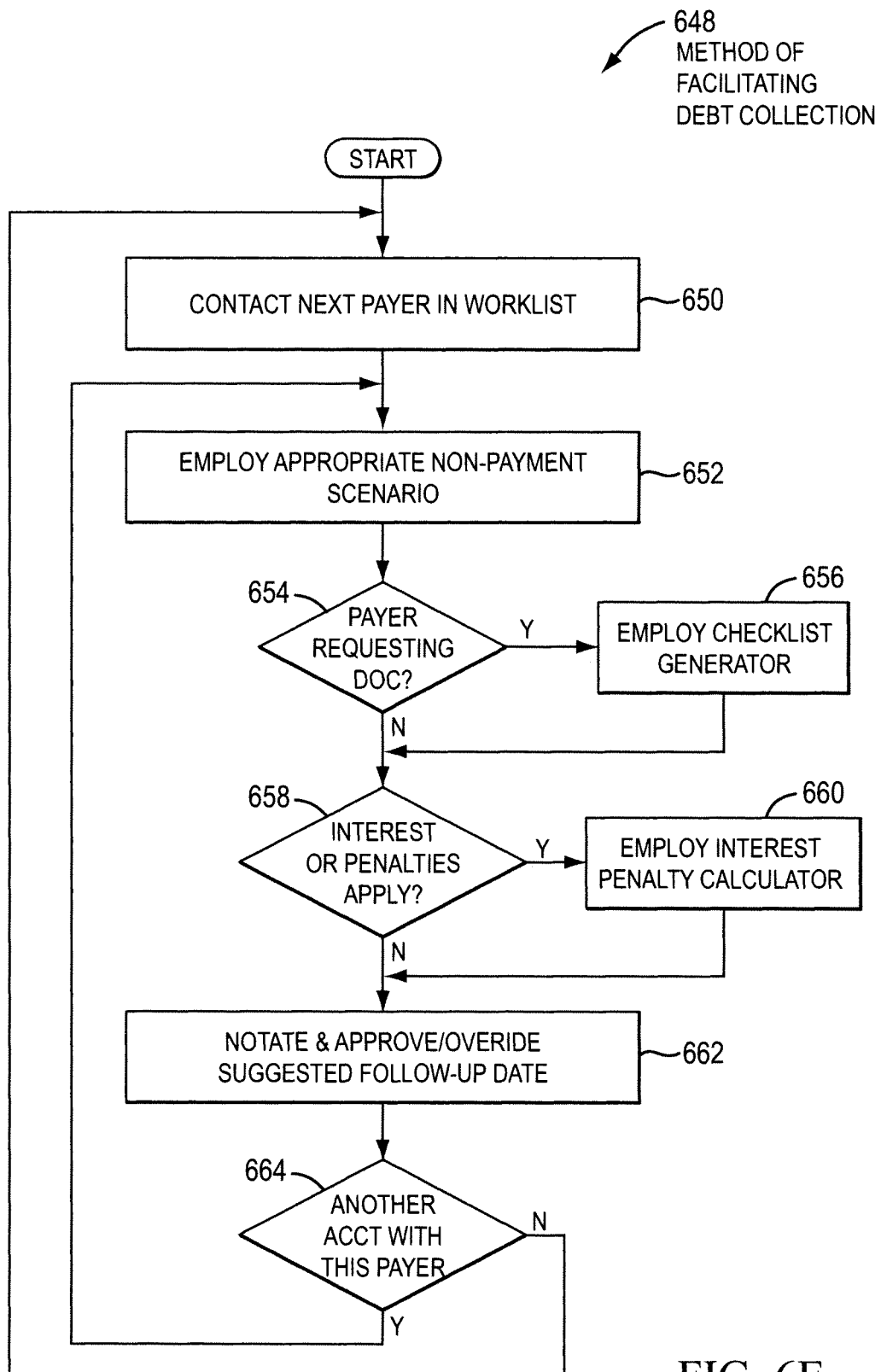
FIG. 6E is a flowchart illustrating a method of facilitating debt collection, in accordance with an embodiment of the present invention.

FIG. 6E is a flowchart illustrating a method 648 of facilitating debt collection, in accordance with an embodiment of the present invention. In step 650, the worklist generated by worklist generator 425 is displayed for the collector. The sequence of accounts to work and correspondingly the sequence of payers to contact is provided in the worklist and the collector contacts the next payer about the next account in the worklist. The collector guidance engine 430 in step 652 may offer a choice of scenarios from which the collector may determine a scenario that fits the account, and payer characteristics. In one embodiment, the scenarios displayed by collector guidance engine 430 are all specific to the payer being contacted or to the payer type, and the collector may only need to determine which scenario fits the account characteristics.

Each scenario provided by collection guidance engine 430 provides particularized collection guidance, questions to ask of the payer, legal information to state, notations to make, etc. If the collector in step 654 determines that a reason for non-payment includes missing documentation, the collector in step 656 may invoke checklist generator 433 to create a checklist of items to forward to the payer. If collector guidance engine 430 in step 658 determines there is interest due on the account receivables or penalties associated with non-payment, collector guidance engine 430 in step 660 invokes interest and penalty calculator 435 to enable the collector to calculate interest and/or penalties to assist with payment negotiation. Collector guidance engine 430 in step 662 prompts the collector as to how to notate the contact with the payer, and further provides a suggested follow-up date for subsequently contacting the payer regarding the account given the scenario selected. Collector guidance engine invokes priority calculating engine 414 to reprioritize accounts and batches of accounts after such notations are made and follow-up dates are indicated. If in step 664 there are more accounts to discuss with the same payer, collector guidance engine 430 returns to step 652 to indicate which account should be next. If there are no more accounts to discuss with this same payer, collector guidance engine 430 returns to step 650 and displays the next payer for the collector to contact. The method 648 then ends.

Figure 6F:
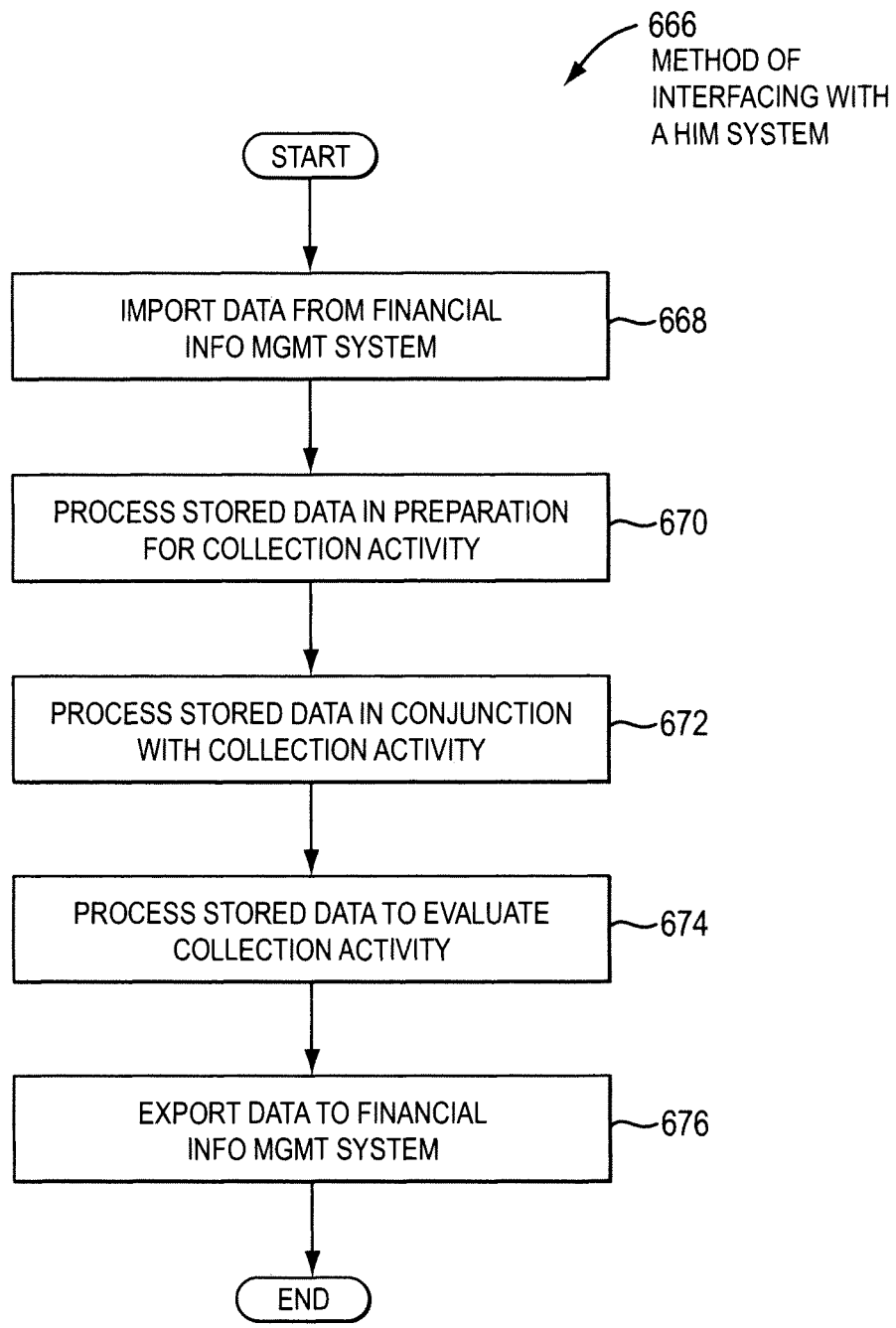
FIG. 6F is a flowchart illustrating a method of interacting with a financial information management system (HIM system), in accordance with an embodiment of the present invention.

FIG. 6F is a flowchart illustrating a method 666 of interacting with a financial information management system (HIM system), in accordance with an embodiment of the present invention. Data is exchanged between a financial information management system 110 and debt collection system 135, in support of minimizing revenue loss. In step 668, data is imported to data normalization/storage module 315 from financial information management system 110 through API 115. Record types received from financial information management system 110 include collections records, notes records, and transaction records. Collections records (aka account records) provide data associated with accounts receivable for a particular bill of sale/service. Notes records provide additional information about the accounts, such as information about contacts made with payers in association with collection activity. Transactions records may include financial transactions associated with the account, including payments, adjustments and charges. Data normalization/storage module 315 stores the imported data onto debt collection tables 450. In step 670, debt collection system manager 405 coordinates processing of data stored on debt collection tables 450, in preparation for collections activity. Processing in this step may include the method 600 of generating an expected bad debt index table, the method 612 of generating a contractual adjustment table, the method 624 of generating a gross net conversion table, the method 632 of prioritizing debt collection, etc. In step 672, debt collection system manager 405 coordinates processing of stored data in conjunction with collection activity. Processing in this step may include method 648 of facilitating debt collection, in which new note, call log and checklist records, etc., are created by collection guidance engine 430 in association with data storage manager 440. In step 674, debt collection system manager 405 coordinates processing of stored data to evaluate collections activity. Functionality in this step may include report generation enabled by report generator 445, updating of historical tables, such as historical debt percentage table 450 and pooled residual percentage table 450. In step 676, debt collection system manager 405 coordinates data export, back to financial information management system 110 through API 115. Records exported include notes records. Method 666 then ends.

FIG. 7 illustrates an example aging table 335, in accordance with an embodiment of the present invention. As shown, aging table 335 includes a plurality of buckets 705a-705j. More specifically, aging table 335 includes an adjustment transaction bucket 705a at 30 days of age (relative to an aging date), an adjustment transaction bucket 705b at 60 days of age, and so on. Aging table 335 further includes a payment transaction bucket 705c at 30 days of age, a payment transaction bucket 705d at 60 days of age, and so on. Aging table 335 farther includes a refund transaction bucket 705e at 30 days of age, a refund transaction bucket 705f at 60 days of age, and so on. Aging table 335 further Includes a denial transaction bucket 705g at 30 days of age, a denial transaction bucket 705h at 60 days of age, and so on. Aging table 335 further includes an aging account bucket 705i at 30 days of age, an aging account bucket 705j at 60 days of age, and so on. Aging table 335 may further include additional buckets for additional transaction types, for additional ages, and for additional criteria that support the generation of precise metrics that accurately reflect operational performance.

The Healthcare Collections Embodiment

The healthcare industry is typical of an industry that relies upon revenue collection operations.

In one embodiment, the Microsoft SQL Server, a commonly known data platform, is employed to house the incoming transactional and account data, data related to insurance companies, organizational groups, transaction types, revenue collectors, etc. Different information management systems 110 may have different information on their transaction and account records. If information from the primary information management systems 110 is missing, other sources may be used to obtain the information. A data transformation package, such as SQL Server 2005 Integration Services, may be is employed to extract data from each information management systems 110, to transform the data, and to load it into SQL Server database tables, e.g., debt collection tables 450.

The SQL Server database may contain several debt collection tables 450 including, as follows:
- an address table, which includes addressee information for items on the checklist;
- a call log table, which includes records of contacts made by collectors as well as activities performed by associates related to the accounts;
- a checklist and a checklist items table, which include information requested by payers;
- a collections table, which includes all relevant information associated with encounters, including patient demographics, insurances on record, and insurance balance;
- a diagnosis surgical codes table, which includes medical detail for accounts;
- an expected bad debt index table, which includes probabilities of bad debt for each payer, based on probability of bad debt factors;
- a historical debt percentage table, which includes historical information about payers, such as financial liability indicator, account age, probability of bad debt, percentage of account balance paid, service type (DRG or MSDRG, CPTs, etc.), etc; a pooled residual percentage table, which includes pooled residual percentages associated with payers of similar size and characteristics;
- a gross net conversion table, which includes information about contracted discounts by payer type and patient type;
- a historical gross net average, which includes historic averages for those payers and patient types;
- a contractual adjustment table, which includes information about contracts between payer and service provider, including adjustments based on service characteristics;
- an import source table, which includes information about the financial information management system from which data is imported;
- an insurance phone table and a phone number table, which include telephone number information for payers;
- an insurance plans table, which includes information related to payers, links payers to debt collection resources and collectors to payer types, provides information about appropriate collections time frames by payer, payer types in terms of reimbursement models (this is self pay, commercially insured, government insured for example), and information employed for batching accounts, either by payer or across payers;
- a job aide answer table, which includes account information logged by collectors;
- a law table, which includes statements of law;
- a checklist status table, a checkout status table, and a checklist item status table, which list dispositions for a checklist and checklist item;
- a communication method table, which lists preferred methods for communicating checklist items to payers;
- a debt collection resource table, which includes information about debt collection resources;
- a number of import tables for processing input from financial information management systems;
- a notation table, which includes phrases employed to auto-generate comprehensive notes;
- a notes table, which includes imported account information;
- a question table, which includes questions that collectors ask of payers based on scenarios;
- a scenario table, which includes common patterns of information related to account disposition and payer types;
- a surgical CPT codes and ORG table, which includes information about procedures and diagnoses for particular accounts;
- a transactions table, which includes information about particular charges, payments and adjustments made to an account;
- a claim reference table, which includes the unique claim reference numbers for an account; and
- a users table, which includes information that supports a secured interface to the invention.

The Expected Bad Debt Table:

Fields that may be stored on the Expected Bad Debt table include:
- financial liability indicator, which identifies the payer;
- one or more probability of bad debt factors and
- a probability defining the % of bad debt predicted given the payer and probability of bad debt factors.

Import Processing:

Embodiments of the invention receive data from multiple sources at various times. The data may arrive at the server via FTP transfers. In one embodiment, the server runs an update service that scans inbound file directories every 10 minutes. If a new file arrives, the application pulls the file and runs import scripts. The selected financial data may be imported into database tables specifically designed for import processing. The imported financial data may then be processed according to record type.

Collections Table 450 Import:

Embodiments of the invention may move account data to the collections table 450, depending upon whether it belongs to an account already in the system, or to an account not yet in the system. In the case of data for an existing account, collection fable records are updated. In the case of data for a new account, collection table records are added. For all records on the collections table 450, import processing then:

Initializes the collections table priority field to Null.
Calculates net account balance.
Calculates priority.

Calculation of Net Account Balance:

For an account, net account balance may be calculated as follows:
- Locate a contractual adjustment factor in the contractual adjustment table 450, having a financial liability indicator and account characteristics that match those on the collections record.
- If the retrieved contractual adjustment factor is available, calculate Net Account Balance=the account balance on the Collections record*contractual adjustment factor.
- if the retrieved contractual adjustment factor is Null, locate a gross net conversion factor in the gross net conversion table 450, having a financial liability indicator and account characteristics that match those on the collections record. If the retrieved gross net conversion factor is Null, Net Account Balance=the account balance on the Collections record*1, else net account balance the account balance on the collections record*gross net conversion factor.

Calculation of Priority:

For an account, Priority is calculated as follows:
- Locate from the CallLog table 450 the last call date (the date on which the liable payer was last contacted) and last follow-up date set for the payer.
- Set D by dividing the difference between these dates by 2.

Create an Adjusted Call Date by adding D to the Last Call Date.

If the insurance plans fable 450 indicates that for this payer the collections period has not yet started, set Priority=zero. In one embodiment, a priority set to zero may represent that the account will not appear on a worklist.

Else, if the last call date is today, set the Priority=zero.

Else, if the adjusted call date has passed hut the Follow-up Date has not yet been reached, calculate a linear increase in the value of Priority as follows:

Calculate the Probability of Bad Debt based on the patient discharge date.

Set Priority=(Net Acct Balance*Probability of Bad Debt)/Adjusted Call Date*(Adjusted Call Date−Follow-up Date−Present Date+1).

Else, set the Priority as follows:

Calculate the Probability of Bad Debt based on the patient discharge date.

Set Priority=Net Acct Balance*Probability of Bad Debt.

Calculation of Probability of Bad Debt:

Set Age of Account=present date−patient discharge date.

Set Age Bucket to 0, 30, 60, 90, 120 according to age of account, where Age Bucket=0 if Age of Account=0-30, etc.

Locate Probability of Bad Debt field on Expected Bad Debt Index table 450 by matching probability of bad debt factors and the Financial Liability Indicator.

If located Probability of Bad Debt is Null, employ 1 as the Probability of Bad Debt.

Notes Table 450 Import:

Embodiments of the invention match the imported note records to their associated account on the Collections table 450, then delete all existing notes for that account from the Notes table and replace them with the imported notes data.

Transactions Table 450 Import:

Embodiments of the invention group the imported transactions records by account. For each account that has transaction records, any existing records are deleted from the Transactions table 450 and the imported transaction records are inserted. The imported transaction records are then filtered to exclude transaction notes.

Post Import Processing:

Embodiments of the invention poll to determine whether an import has finished. Once it makes that determination, it performs the following functions:

Assigns a collector to each account;
Calculates priority; and
Batches the accounts.

Collector Assignment:

Accounts may select collectors based on a collector assignment procedure, e.g., based on factors such as account characteristics, payer characteristics, available staffing resources, etc. The collector assignment procedure may be based on the debt collection resources of a collector. Accounts may be matched to the collector that most closely associated with a department, account location in the collections process, age of the account, account type, source of financial data, names associated with the account, account balance, and payer balance.

The collection assignment procedure may involve examining low account balances, a zero account balance or a credit account balance. Accounts are often chosen for debt collection based on overall account balance. If an account balance is low, zero, or negative (a credit), the account may be passed over in favor of other accounts with higher account balances, or may be assigned to a credit balance queue. Embodiments of the invention may dissect an account balance into its components to examine whether the overall account balance is a sum of a significant debit balance of one liable payer and a significant credit balance of another payer. While the overall balance may be low, zero, or negative, there is a significant debit balance worthy of debt collection. Additionally, embodiments may be valuable in industries that have the potential for fluctuating account balances or portions of account balance that are percentages of others.

Account Batching;

The assignment of two fields on the Collections table 450 drives batching: BatchID, which uniquely identifies a batch of accounts, and BatchSum, which identifies the priority for the batch of accounts. To initialize these fields, for each Collections record, set BatchID=zero and BatchSum=zero. Into a temporary table 450, load fields from the Collections table 450. In one embodiment, filter to load only Collections records where the Priority>0 or a customizable minimum priority or a customizable minimum account balance or other criteria. Group the records by facility, batching indicator, payer and collector. Order records by payer, collector and descending priority. For each Collections record in a set of Collections records that share the same payer, collector and facility:

For the first record in a set
If the payer has a valid batching indicator, retrieve the BatchSetting associated with the pay from the insurance plans table. Else set BatchSetting=1.

For subsequent record in the set
Increment tally of # of records in set
Increment BatchSum by Priority
Insert the account # into a temporary table 450

For the last record in a set or when the batch setting has been reached:
Store the updated values for BatchSum and Batchid into the Collections table 450 for all Collections records that have an account # in the temporary table.
Reinitialize the temporary table, tally, BatchSum
Increment BatchID The batching indicator in the insurance plans table can be set to the same value for multiple payers, to create cross-payer batching.

Worklist Generation:

Once the import runs and the post-import assignments have been made, the information exists in the tables to allow worklists to be generated on demand by the secured user interface. Users with administrator roles may setup new users with a userid and password. Users who navigate to a designated URL and enter the appropriate identification gain authorized access to the user interface.

In one embodiment, after logging in, the user interface selectively displays aggregated account information, ordered by debt collection resource and collector (FIG. 8A). For each debt collection resource and collector, the information includes a quantity of accounts and aggregated balances presented in totality, as well as in buckets that represent account age. For instance, if an account is between 30 days and 59 days old, it will be counted in and its balance will be aggregated in the 30-60 day buckets. The name of each collector may be selectively clicked to display the collector's worklist of accounts (FIG. 8B).

All accounts are loaded for the selected collector into a temporary table 450. To render the accounts in the order that they should be worked, the accounts are sorted by Batch- Sum. The user interface then renders a suitable number of the accounts from the temporary table 450. For example, the number of accounts selected may be determined on the number that can be displayed to a collector by collector guidance engine 430 on one page, thereby minimizing the impact to system performance.

Referring to FIG. 8B, information displayed for accounts on the worklist includes:
- liable insurance plan, which is the payer with the highest liability on the account;
- patient type, which identifies characteristics related to a patient's admission and treatment;
- encounter number, also known as an accounts receivable identifier, which uniquely correlates to an invoice generated for the patient;
- patient name;
- account age, which is measured from either the date of discharge or date that a final bill was prepared;
- discharge date;
- last called date, which is the most recent date on which a call was placed by a collector;
- final bill date, which applies to long-term patients for whom an invoice was prepared;
- account balance;
- insurance plan 1, which is the patient's primary insurer;
- insurance plan 2, which is the patient's secondary insurer;
- a priority amount; and
- a batch priority.

The encounter number and the insurance plan 1 may each be selectively clickable. When an encounter number on the worklist is clicked, a page of detailed account information is displayed (FIG. 8C). Account receivable details may be displayed with buttons that facilitate navigating to other accounts within the call list. Information for the next four accounts on the worklist, including encounter number, insurer and the insurer's contact phone number, are shown. The displayed account details include:
- encounter number;
- account location (e.g., FB=final bill);
- patient name;
- patient date of birth;
- patient guarantor;
- patient type (e.g., TELIINP);
- patient phone number;
- admit date;
- discharge date;
- account age;
- final bill date;
- total charges;
- account balance;
- patient balance;
- priority;
- liable insurer code mnemonic;
- liable insurer name;
- liable insurer balance;
- liable insurer admit phone;
- liable insurer group;
- liable insurer subscriber ID;
- liable insurer contract document lookup;
- liable insurer contact lookup;
- primary insurer code mnemonic;
- primary insurer name;
- primary insurer balance;
- primary insurer admit phone;
- primary insurer group;
- primary insurer subscriber ID;
- primary insurer contract document lookup;
- primary insurer contact lookup;
- secondary insurer code mnemonic;
- secondary insurer name;
- secondary insurer balance;
- secondary insurer admit phone;
- secondary insurer group;
- secondary insurer subscriber ID;
- secondary insurer contract document lookup;
- secondary insurer contact lookup;
- tertiary insurer code mnemonic;
- tertiary insurer name;
- tertiary insurer balance;
- tertiary insurer admit phone;
- tertiary insurer group;
- tertiary insurer subscriber ID;
- tertiary insurer contract document lookup; and
- tertiary insurer contact lookup.

For each insurer, contract document lookup and contact lookup are selectively clickable fields. Clicking on contract document lookup displays information about the payer contract. This information contains summary information about the contract terms as well as images of the actual contracts themselves. Clicking on contact lookup displays payer contact information. The account details further include selectively clickable fields to display information about call log, check list, job aide, system notes and transaction detail.

Clicking on the call log field adds a grid of information about calls made by collectors for this account (FIG. 8D). Information displayed for each call includes:
- Collector placing call;
- Payer reason for non-payment;
- Call Date;
- Follow-up Date; and
- Notes.

Clicking on the checklist field returns a grid of checklist information requested by a payer (FIG. 8B), including:
- Checklist identifier;
- Insurance plan;
- Request date;
- Status;
- Completion Date;
- Checklist item notes; and
- Selectively clickable field to view/edit the checklist Clicking on the Create New Checklist field or on the view/edit checklist field displays a form (FIG. 8F) that allows a collector to both add and edit information about the checklist, including:
- Insurance plan;
- Medical record number;
- Mail To name;
- Mail To fax;
- Mail To e-mail;
- Mail to Address;
- Mail method;
- Provider facility;
- Checklist Item type;
- Checklist Item status;
- Checklist Item notes; and
- Checklist notes.

Multiple items may be created for one checklist.

Clicking on the job aide field displays a scenario drop-down box and the option to create or edit a checklist (FIG. 8G).

Selecting a scenario from the drop down box (e.g., Denial—Incorrect HCPCS Rev Codes) returns information about the selected scenario (FIG. 8H) including:

Questions for the collector to ask the insurer, when placing a call on this account;
Text fields for the collector to log the answer given by the payer to each question;
Text field for additional information and notes about the scenario and/or account; and
Suggested Follow-up Date that can be overwritten if need be, based on contact with the payer.

Clicking on the system notes field displays a grid of notes related to the account in reverse order of the date they were entered (FIG. 8I).

Clicking on transaction detail displays a grid of payment and adjustment transactions (FIG. 8J), including:
Transaction code (e.g., P=payment, A=adjustment);
Transaction date;
Transaction description; and
Transaction amount.

Referring again to FIG. 8B, when a primary insurance plan is clicked, only accounts on the collector's worklist that match the selected insurance plan may be displayed.

When an account is worked (e.g., any of the actions described above has resulted in a change to the account characteristics, such as contact with the payer has resulted in the creation of a Call Log entry), collector guidance engine 450 resets the Priority for that, account to zero. If an account is touched, the priority is set to 0 and the batch priority is recalculated, thus changing the worklist. In one embodiment batched accounts may be accessed via the next function in the account details screen, since the list of accounts associated with the batch may have changed given that the priority batch sum may have changed due to the worked accounts. Additionally, if the worked account is one of multiple accounts with the same BatchID, collector guidance engine 450 may await indication of whether other accounts with the same BatchID have been worked. If so, their Priority is also set to zero. Once all accounts in the same BatchID have been processed, collector guidance engine 430 invokes priority calculating engine 414 to re-calculate the BatchSum for the accounts assigned to the collector. In this manner, the worklist can be refreshed to no longer show the accounts that have been worked and instead to show an updated order of which accounts to work next. It is understood that any manner of indicating an account has been worked thereby signaling to the collector to move to the next account can be employed as well.

Whereas many collection activities described above may result in an indication that an account has been worked, generation of a checklist may not. The reason is that a note is posted for checklist generation and checklist completion. Such checklist activity is not sufficient to re-prioritize accounts and/or batches. As a result, an account may continue to appear on the worklist if the only action taken relates to checklist activity.

At the top of many of the secured user interface pages, additional navigation options may include:
Home, which displays that aggregated account information by debt collection resource and collector, as shown in FIG. 8A;
Advanced Search, which displays additional search options (FIG. 8K), including:
A keyword search that supports filtering accounts by:
Encounter number,
patient name,
collector,
financial class=financial liability indicator,
patient type,
account age range, and
priority.

Figure 8T:
FIG. 8A-8ZG illustrate user interface screens generated by the debt collection system, in accordance with an embodiment of the present invention.
Figure 8Y:

For example, entering Adams in the patient name text field and clicking Search displays information for the top 25 accounts that meet the search criteria (FIG. 8M), including:
Collector,
Financial class=financial liability indicator
Patient type,
encounter number,
Patient name,
Account age,
Discharge date,
Last call date,
Final bill date,
Account balance,
Primary insurer, and
Secondary insurer.
A claim number search, which supports filtering accounts by unique citizen reference number. For example, entering a particular claim number in the text field and clicking Search displays a page of detailed account information as described with reference to FIG. 8C above.
Assembly Worklist, which returns information about checklist requests (FIG. 8L), including:
A grid of information for checklist requests, including:
Checklist Identifier;
Encounter number;
Patient name;
Insurance plan;
Request date;
Status;
Completion date;
Notes;
Selectively clickable fields to
View the checklist,
Checkout the checklist, and
Undo the checkout; and
Checked out to identifier.
Filter options for the displayed grid, including:
a drop down box of checklist statuses. The displayed grid defaults to display checklist requests with a status=requested.
a searchable text field. For instance, entering a partial encounter number of patient name returns a grid of matching check list requests.
a reset button to restore the grid to all checklist requests with a status=requested.
a checkbox that will display only checklist requests checked out to the secured interface user.
Manage System, which displays administration options for
Scenarios, which when clicked will display;
An option to create a new scenario (FIGS. 8O and 8P), and
A grid of existing scenarios (FIG. 8N). A scenario in the grid may selectively be:
Edited,
Deleted, or
Displayed. FIG. 8Q depicts a preview of how the scenario will look to the user.
Referring to FIGS. 8O and 8P, information for each scenario includes:
A scenario name;
A default number of Follow-up days;
An association to one or more debt collection resources;

An association to one or more selectively orderable questions;
An association with one or more statements of law
Questions, which when clicked will display:
   An option to create a new question (FIGS. 8R and 8S), and
   A grid of existing questions (FIG. 8R). A question in the grid may selectively be:
      Edited (FIG. 8T), or
      Deleted.
   Referring to FIGS. 8S and 8T, information for each question includes:
   Question text;
   Answer text;
   Question/Answer type; and
   Question Required Checkbox.
Required notations, which when clicked will display:
   An option to create a new notation (FIGS. 8U and 8ZD), and
   A grid of existing notations (FIG. 8U). A notation in the grid may selectively be:
      Edited (FIG. 8ZE), or
      Deleted.
   Referring to FIGS. 8ZD and 8ZE, information for each question includes:
   Financial liability indicator; and
   Notation text
Statements of Law, which when clicked will display:
   An option to create a new statement of law (FIGS. 8V and 8W), and
   A grid of existing statements of law (FIG. 8V). A statement of law in the grid may selectively be:
      Edited (FIG. 8ZC), or
      Deleted.
   Referring to FIGS. 8W and 8ZC, information for each statement of law includes text.
Checklist Items, which when clicked will display:
   An option to create a new checklist item (FIGS. 8X and 8ZF), and
   A grid of existing checklist items (FIG. 8X). A statement of law in the grid may selectively be:
      Edited (FIG. 8ZG), or
      Deleted.
   Referring to FIGS. 8ZF and 8ZG, information for each checklist item includes text.
Registered users, which when clicked will display a new user registration form (FIG. 8Y). Information for each new user includes:
   User Name;
   a Group;
   Team;
   Password;
   E-mail;
   User Type; and
   Account Status.
User list, which when clicked displays a grid of registered users (FIG. 8Z)
Reports/References/Resources, which displays a grid of reports, references and help (FIG. 8ZA). An example of a report is the Penetration report, described above and shown in FIG. 9AA, 9AB, 9B, and 9C.
Change Password, which provides the user to change their password at will (FIG. 8ZB); and
Logout, which removes authorization to access the secured user interlace.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:
1. A method, comprising:
   obtaining, by a computer system, transaction records for a plurality of accounts from a plurality of different financial databases associated with a plurality of different healthcare providers in a plurality of different formats, the plurality of accounts being associated with a plurality of payers responsible for paying debts associated with the plurality of accounts, the plurality of payers including a plurality of financial companies, each financial company being responsible for paying particular debts associated with two or more of the plurality of accounts;
   normalizing the transaction records obtained from the plurality of different financial databases associated with the plurality of different healthcare providers into a common format;
   setting, by the computer system, a configuration value establishing a maximum number of accounts that will be discussed with each financial company of the plurality of financial companies during a single contact by a collector with the financial company;
   storing payment adjustment information associated with each of the payers of the plurality of payers, the payment adjustment information indicating payment adjustment expectations based on historical financial information;
   calculating, based on the normalized transaction records, net account balance due for each account of the plurality of accounts, the calculating the net account balance due including obtaining respective payment adjustment information associated with each payer associated with each account of the plurality of accounts and making adjustments based on the respective payment adjustment information obtained;
   determining, based on the normalized transaction records, an age associated with each account of the plurality of accounts;
   determining for each account of the plurality of accounts an amount of time elapsed since a date of last contact of the payer for the account;
   generating predicted revenue information for each account of the plurality of accounts from the associated net account balance due, the age, the amount of time elapsed since the date of last contact, and probabilities of account recovery;

calculating, by the computer system, an account priority for each account of the plurality of accounts based on the predicted revenue information;

grouping at least a first subset of two or more first accounts of the of the plurality of accounts associated with a first financial company into a first batch of first accounts based on the maximum number associated with the first financial company and on a corresponding account priority of the calculated account priorities for each first account of the subset, a number of first accounts in the first batch being greater than two and not exceeding the maximum number associated with the first financial company;

calculating, by the computer system, a first batch priority for the first batch, the first batch priority for the first batch being based on the account priority of at least one first account in the first batch;

generating a first worklist for a first collector, the first worklist identifying a first set of the plurality of first accounts, the worklist identifying at least the first batch of first accounts and one other account from the plurality of accounts that is not included in the first batch, the first worklist identifying a first prioritization order of accounts for the first collector to attempt to collect, the first prioritization order being based on the account priority for each account included in the first worklist that is not included in the any batch including the first batch and based on the first batch priority for the first batch;

providing the first worklist to the first collector;

grouping at least a second subset of two or more second accounts of the of the plurality of accounts associated with a second financial company into a second batch of second accounts based on the maximum number associated with the second financial company and on a corresponding account priority of the calculated account priorities for each first account of the subset, a number of second accounts in the second batch being greater than two and not exceeding the maximum number associated with the second financial company;

calculating, by the computer system, a second batch priority for the second batch, the second batch priority for the second batch being based on the account priority of at least one second account in the second batch;

generating a second worklist for a second collector, the second worklist identifying a second set of the plurality of second accounts, the second worklist identifying at least the second batch of second accounts and one other account from the plurality of accounts that is not included in the second batch, the second worklist identifying a second prioritization order of accounts for the second collector to attempt to collect, the second prioritization order being based on the account priority for each account included in the second worklist that is not included in any batch including the second batch and based on the second batch priority for the second batch; and providing the second worklist to the second collector.

2. The method of claim 1, wherein the account priority for a particular account is defined by analyzing predicted levels of expected revenue loss due to lack of payment relative to age and analyzing information related to the amount of time elapsed since the date of last contact.

3. The method of claim 1, wherein the net account balance due is calculated based on gross net conversion factors or contractual adjustment factors.

4. The method of claim 1, wherein the calculating the first batch priority includes evaluating whether account credits or low account balances are offsetting an overall batch balance or an average batch balance.

5. The method of claim 4, wherein the first batch priority is based on the account priority, account characteristics, or collector preferences with respect to the maximum number.

6. The method of claim 1, further comprising generating a report of accounts worked by collectors relative to account inventory.

7. The method of claim 1, wherein the age comprises a difference between a transaction date and an aging date.

8. The method of claim 7, wherein the aging date comprises a range of days.

9. The method of claim 1, further comprising:
identifying whether any account priority has changed based on a collection act occurring during an elapsed time; and
dynamically generating another worklist based on a changed account priority.

10. The method of claim 1, further comprising:
creating a checklist of information or documents to be gathered from an account holder associated with one account from the plurality of accounts; and
providing the checklist to the first collector.

11. A system, comprising:
at least one processor;
a memory storing instructions that, when executed by the at least one processor, cause the system to perform:
obtaining transaction records for a plurality of accounts from a plurality of different financial databases associated with a plurality of different healthcare providers in a plurality of different formats, the plurality of accounts being associated with a plurality of payers responsible for paying debts associated with the plurality of accounts, the plurality of payers including a plurality of first financial companies, each financial company being responsible for paying particular debts associated with two or more of the plurality of accounts;
normalizing the transaction records obtained from the plurality of different financial databases associated with the plurality of different healthcare providers in a common format;
setting, by the computer system, a configuration value establishing a maximum number of accounts that will be discussed with each financial company of the plurality of financial companies during a single contact by a collector with the financial company;
storing payment adjustment information associated with each of the payers of the plurality of payers, the payment adjustment information indicating payment adjustment expectations based on historical financial information;
calculating, based on the normalized transaction records, net account balance due for each account of the plurality of accounts, the calculating the net account balance due including obtaining respective payment adjustment information associated with each payer associated with each account of the plurality of accounts and making adjustments based on the respective payment adjustment information obtained;
determining, based on the normalized transaction records, an age associated with each account of the plurality of accounts;

determining for each account of the plurality of accounts an amount of time elapsed since a date of last contact of the payer for the account;

generating predicted revenue information for each account of the plurality of accounts from the associated net account balance due, the age, the amount of time elapsed since the date of last contact, and probabilities of account recovery;

calculating an account priority for each account of the plurality of accounts based on the predicted revenue information;

grouping first subset of two or more first accounts of the of the plurality of accounts associated with a first financial company into a first batch of first accounts based on the maximum number associated with the first financial company and on a corresponding account priority of the calculated account priorities for each first account of the first subset, a number of first accounts in the first batch being greater than two and not exceeding the maximum number associated with the first financial company;

calculating a first batch priority for the first batch, the first batch priority for the first batch being based on the account priority of at least one first account in the first batch;

generating a first worklist for a first collector, the first worklist identifying a first set of the plurality of accounts, the first worklist identifying at least the first batch of first accounts and one other account from the plurality of accounts that is not included in the first batch, the first worklist identifying a first prioritization order of accounts for the first collector to attempt to collect, the first prioritization order being based on the account priority for each account included in the first worklist that is not included in any batch including the first batch and based on the first batch priority for the first batch; and providing the worklist to the first collector;

grouping at least a second subset of two or more second accounts of the of the plurality of accounts associated with a second financial company into a second batch of second accounts based on the maximum number associated with the second financial company and on a corresponding account priority of the calculated account priorities for each first account of the subset, a number of second accounts in the second batch being greater than two and not exceeding the maximum number associated with the second financial company;

calculating, by the computer system, a second batch priority for the second batch, the second batch priority for the second batch being based on the account priority of at least one second account in the second batch;

generating a second worklist for a second collector, the second worklist identifying a second set of the plurality of second accounts, the second worklist identifying at least the second batch of second accounts and one other account from the plurality of accounts that is not included in the second batch, the second worklist identifying a second prioritization order of accounts for the second collector to attempt to collect, the second prioritization order being based on the account priority for each account included in the second worklist that is not included in any batch including the second batch and the second batch priority for the second batch; and providing the second worklist to the second collector.

12. The system of claim 11, wherein the account priority for a particular account is defined by analyzing predicted levels of expected revenue loss due to lack of payment relative to age and analyzing information related to the amount of time elapsed since the date of last contact.

13. The system of claim 11, wherein the net account balance due is calculated based on gross net conversion factors or contractual adjustment factors.

14. The system of claim 11, wherein the instructions further cause the system to evaluate whether account credits or low account balances are offsetting an overall batch balance or an average batch balance when generating the first batch priority.

15. The system of claim 14, wherein the first batch priority is based on the account priority, account characteristics, or collector preferences with respect to the maximum number.

16. The system of claim 11, wherein the instructions further cause the system to generate a report of accounts worked by collectors relative to account inventory.

17. The system of claim 11, wherein the instructions further cause the system to dynamically regenerate another worklist based on a collection act occurring during an elapsed time.

18. The system of claim 11, wherein the instructions further cause the system to create a checklist of information or documents to be gathered from an account holder associated with one account from the plurality of accounts, and to provide the checklist to the first collector.

19. A system, comprising:
  processor means for obtaining transaction records for a plurality of accounts from a plurality of different financial databases associated with a plurality of different healthcare providers in a plurality of different formats, the plurality of accounts being associated with a plurality of payers responsible for paying debts associated with the plurality of accounts, the plurality of payers including a plurality of first financial companies, each financial company being responsible for paying particular debts associated with two or more of the plurality of accounts;
  processor means for normalizing the transaction records obtained from the plurality of different financial databases associated with the plurality of different healthcare providers in a common format;
  processor means for setting, by the computer system, a configuration value establishing a maximum number of accounts that will be discussed with each financial company of the plurality of financial companies during a single contact by a collector with the financial company;
  processor means for storing payment adjustment information associated with each of the payers of the plurality of payers, the payment adjustment information indicating payment adjustment expectations based on historical financial information;
  processor means for calculating, based on the normalized transaction records, net account balance due for each account of the plurality of accounts, the calculating the net account balance due including obtaining respective payment adjustment information associated with each payer associated with each account of the plurality of accounts and making adjustments based on the respective payment adjustment information obtained;

processor means for determining, based on the normalized transaction records, an age associated with each account of the plurality of accounts;

processor means for determining for each account of the plurality of accounts an amount of time elapsed since a date of last contact of the payer for the account;

processor means for generating predicted revenue information for each account of the plurality of accounts from the associated net account balance due, the age, the amount of time elapsed since the date of last contact, and probabilities of account recovery;

processor means for calculating an account priority for each account of the plurality of accounts based on the predicted revenue information;

processor means for grouping first subset of two or more first accounts of the of the plurality of accounts associated with a first financial company into a first batch of first accounts based on the maximum number associated with the first financial company and on a corresponding account priority of the calculated account priorities for each first account of the subset, a number of first accounts in the first batch being greater than two and not exceeding the maximum number associated with the first financial company;

processor means for calculating a first batch priority for the first batch, the first batch priority for the first batch being based on the account priority of at least one first account in the first batch;

processor means for generating a first worklist for a first collector, the first worklist identifying a first set of the plurality of first accounts, the worklist identifying at least the first batch of first accounts and one other account from the plurality of accounts that is not included in the first batch, the first worklist identifying a first prioritization order of accounts for the first collector to attempt to collect, the first prioritization order being based on the account priority for each account included in the first worklist that is not included in the any batch including the first batch and based on the first batch priority for the first batch; and processor means for providing the first worklist to the first collector;

processor means for grouping at least a second subset of two or more second accounts of the of the plurality of accounts associated with a second financial company into a second batch of second accounts based on the maximum number associated with the second financial company and on a corresponding account priority of the calculated account priorities for each first account of the subset, a number of second accounts in the second batch being greater than two and not exceeding the maximum number associated with the second financial company;

processor means for calculating, by the computer system, a second batch priority for the second batch, the second batch priority for the second batch being based on the account priority of at least one second account in the second batch;

processor means for generating a second worklist for a second collector, the second worklist identifying a second set of the plurality of second accounts, the second worklist identifying at least the second batch of second accounts and one other account from the plurality of accounts that is not included in the second batch, the second worklist identifying a second prioritization order of accounts for the second collector to attempt to collect, the second prioritization order being based on the account priority for each account included in the second worklist that is not included in any batch including the second batch and based on the second batch priority for the second batch; and processor means for providing the second worklist to the second collector.

20. The system of claim 19, further comprising processor means for creating a checklist of information or documents to be gathered from an account holder associated with one account from the plurality of accounts, and for providing the checklist to the first collector.

* * * * *

UNITED STATES PATENT AND TRADEMARK OFFICE
CERTIFICATE OF CORRECTION

PATENT NO. : 10,679,284 B2  
APPLICATION NO. : 12/059883  
DATED : June 9, 2020  
INVENTOR(S) : Dick et al.

Page 1 of 1

It is certified that error appears in the above-identified patent and that said Letters Patent is hereby corrected as shown below:

In the Claims

Claim 11, Column 31, Line 12:  
"grouping first subset of two or more first accounts of the"  
Should read:  
-- grouping at least a first subset of two or more first accounts of the --

Claim 19, Column 33, Line 15:  
"processor means for grouping first subset of two or more"  
Should read:  
-- processor means for grouping at least a first subset of two or more --

Signed and Sealed this  
Eighth Day of September, 2020

Andrei Iancu  
*Director of the United States Patent and Trademark Office*